United States Patent
Wood et al.

(10) Patent No.: US 7,634,567 B1
(45) Date of Patent: Dec. 15, 2009

(54) CONFIGURING DATA STORAGE FOR ELECTRONIC MAIL APPLICATION

(75) Inventors: Douglas A. Wood, Westford, MA (US); Uday K. Gupta, Westford, MA (US); Stephen J. Todd, Shrewsbury, MA (US); Andreas L. Bauer, Boxborough, MA (US); Mark A. Parenti, Milford, NH (US); Joseph T. Frank, Boulder, CO (US); Thomas G. Magorka, Roseville, CA (US); David C. Butchart, Sammamish, WA (US); Brian James Martin, Redmond, WA (US)

(73) Assignee: EMC Corporation, Hopkinton, MA (US)

( * ) Notice: Subject to any disclaimer, the term of this patent is extended or adjusted under 35 U.S.C. 154(b) by 328 days.

(21) Appl. No.: 11/824,435

(22) Filed: Jun. 29, 2007

(51) Int. Cl.
*G06F 15/173* (2006.01)
(52) U.S. Cl. .................. 709/226; 707/9; 726/1
(58) Field of Classification Search ......... 709/204–207, 709/226; 379/219; 715/735; 707/9; 726/1
See application file for complete search history.

(56) References Cited

U.S. PATENT DOCUMENTS

| | | | |
|---|---|---|---|
| 7,293,237 B1 * | 11/2007 | Knight et al. | 715/735 |
| 7,552,182 B2 * | 6/2009 | Raghunandan | 709/206 |
| 2002/0065897 A1 * | 5/2002 | Voticky et al. | 709/207 |
| 2006/0075035 A1 * | 4/2006 | Tripp | 709/206 |
| 2007/0116234 A1 * | 5/2007 | Schneider et al. | 379/219 |
| 2007/0124374 A1 * | 5/2007 | Arun et al. | 709/204 |

* cited by examiner

*Primary Examiner*—Jungwon Chang
(74) *Attorney, Agent, or Firm*—Krishnendu Gupta; Jason A. Reyes

(57) ABSTRACT

Described are techniques for processing a data storage configuration request for an application A first user level of a plurality of user levels at which said data storage configuration request is made is determined. One or more rule sets defining mappings between different ones of said plurality of user levels are provided. Each of the different user levels is associated with a different level of abstraction with respect to processing performed in the data storage system for implementing the data storage configuration request. One of the rule sets is selected in accordance with the application, a data service requested in said data storage configuration request, and a user grouping including said plurality of user levels. The data storage configuration request is serviced using rules of the selected rule set.

16 Claims, 17 Drawing Sheets

CONFIGURING DATA STORAGE FOR ELECTRONIC MAIL APPLICATION

BACKGROUND

1. Technical Field

This application generally relates to data storage, and more particularly to techniques used for data storage configuration.

2. Description of Related Art

Configuring data storage resources adequately for electronic mail and other messaging systems is challenging, both from an application performance standpoint and a storage space allocation standpoint.

For example, messaging systems typically allocate message mailboxes of fixed size to the subscribers of the messaging service. So if a subscriber rapidly receives a large number of messages or does not regularly retrieve received messages, there is a good chance that the capacity of the subscriber's mailbox will be exceeded and the mailbox will overflow. This results in loss of messages or inability of message senders to leave further messages for the subscriber. Yet other subscribers may no longer be using their mailboxes, or use only a small portion of their mailboxes' capacities, resulting in a waste of storage space.

Many voice and/or multimedia messaging systems have warning announcements which are provided to subscribers to advise them of the fill level of their mailboxes. While this is a worthwhile feature, it does not specifically help with the problem of mailbox overflow conditions. It can be frustrating to a caller to be informed that the party they are trying to reach has a full mailbox. The result can be loss of business, loss of necessary information, and/or loss of productivity. Two other related problems, from the system administrator's point of view, are the allocation of storage space to mailboxes which are seldom or never fully utilized, and the persistence of logins and their associated mailboxes that are still in place for subscribers who have changed messaging systems or ceased to be subscribers. This last problem is especially of concern in very large systems and/or those designed for public service-provider use.

Some systems provide audits that the system administrator may use manually to provide a means for sizing mailboxes and for expiring logins. But this does not provide the prompt response to changing conditions that is desirable.

Messaging systems typically rely on computer systems that may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Different tasks may be performed in connection with a data storage system. For example, a customer may perform data storage configuration tasks. Such tasks may include, for example, configuring storage for use with an email application. In connection with the configuration processing, tasks may include allocating storage, specifying the logical and/or physical devices used for the storage allocation, specifying whether the data should be replicated, the particular RAID (Redundant Array of Independent or Inexpensive Disks) level, and the like. With such options in connection with performing the configuration, a customer may not have the appropriate level of sophistication and knowledge needed.

Thus, it may be desirable to utilize a flexible technique which assists customers in connection with performing data storage services such as related to data storage configuration. It may be desirable that the technique be adaptable to the particular knowledge level of the user.

SUMMARY OF THE INVENTION

Data storage is configured for electronic mail application. A user interface is provided to allow a user to issue a data storage configuration request to provision storage for an email application. The user interface is customized based on a user sophistication level. Based on the data storage configuration request, communication is executed with a service provider to implement the data storage configuration request. Implementing of the data storage configuration request includes allocating storage for storing mailbox data of the email application.

In accordance with one aspect of the invention is a computer-implemented method for processing a data storage configuration request for an application comprising:

determining a first user level of a plurality of user levels at which said data storage configuration request is made;

providing one or more rule sets defining mappings between different ones of said plurality of user levels, each of said different user levels being associated with a different level of abstraction with respect to processing performed in the data storage system for implementing the data storage configuration request; selecting one of said one or more rules sets in accordance with said application, a data service requested in said data storage configuration request, and a user grouping including said plurality of user levels; and servicing the data storage configuration request, said servicing including using a first rule of said selected rule set to map data of the data storage configuration request from said first user level to another user level and performing a first call from a first service provider associated with the first user level to a second service provider associated with a second of said plurality of user levels. The data storage configuration request may be for provisioning storage for the application. The data storage configuration request may be made from a host to an appliance hosting data storage for the application. The particular rule set selected by said selecting may include one or more quality of service parameters having values selected for a first usage of the application differing from other values for said one or more quality of service parameters selected from a different rule set for a second usage of the application. The first service provider and the second service provider may be located on the appliance. The data storage request may be made from a host to a network configuration of a plurality of data storage systems and said first service provider and said second service provider may be located on a different ones of said plurality of data storage systems. One or more rules engines may be used to perform processing in accordance with said selected rule set to service said data storage configuration request. The first rule may map a first user selected parameter to a second parameter and said second parameter may be included in said first call. The first rule may specify one or more default parameter values and said one or more default parameter values may be included in said first call. The servicing may further include using a second rule of said selected rule set to map data of the first call to the second service provider to data used for a second call from the second service provider to a third service provider associated with a third of said plurality of user levels. The user grouping may include said first, second and third user levels in which the first user level provides a greatest level of abstraction of said first, second and third user levels and said third user level provides a least level of abstraction of said first, second and third user levels. The first rule may provide for application specific mappings of user interface data to other terms included in said first call. The application may be one of an email application, a database application, a medical office application, a law office application, or a banking application. The first rule may include at least one of a variable or a conditional statement evaluated at runtime when processing said data storage configuration request. A rule set selected by said selecting may include one or more rules in which the one or more rules may include at least one default specified in accordance with a requirement of said application. The at least one default may be mapped by said one or more rules to at least one parameter that varies with a data storage system on which storage is used for the data storage configuration request.

In accordance with another aspect of the invention is a data storage system comprising executable code stored in a computer readable medium for processing a data storage configuration request for an application, the computer readable medium comprising executable code for: determining a first user level of a plurality of user levels at which said data storage configuration request is made; providing one or more rule sets defining mappings between different ones of said plurality of user levels, each of said different user levels being associated with a different level of abstraction with respect to processing performed in the data storage system for implementing the data storage configuration request; selecting one of said one or more rules sets in accordance with said application, a data service requested in said data storage configuration request, and a user grouping including said plurality of user levels; and servicing the data storage configuration request, said servicing including using a first rule of said selected rule set to map data of the data storage configuration request from said first user level to another user level and performing a first call from a first service provider associated with the first user level to a second service provider associated with a second of said plurality of user levels. The executable code for servicing may further include code for using a second rule of said selected rule set to map data of the first call to the second service provider to data used for a second call from the second service provider to a third service provider associated with a third of said plurality of user levels. The user grouping may include said first, second and third user levels, said first user level providing a greatest level of abstraction of said first, second and third user levels and said third user level providing a least level of abstraction of said first, second and third user levels. The first rule may provide for application specific mappings of user interface data to other terms included in said first call. The selected rule set may define best practices for said application and provide for different levels of automation of said best practices in connection with said servicing, different levels of automation being associated with different ones of said plurality of user levels.

One or more implementations of the invention may provide one or more of the following advantages.

Provisioning data storage for email can be facilitated for users having different levels of sophistication.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
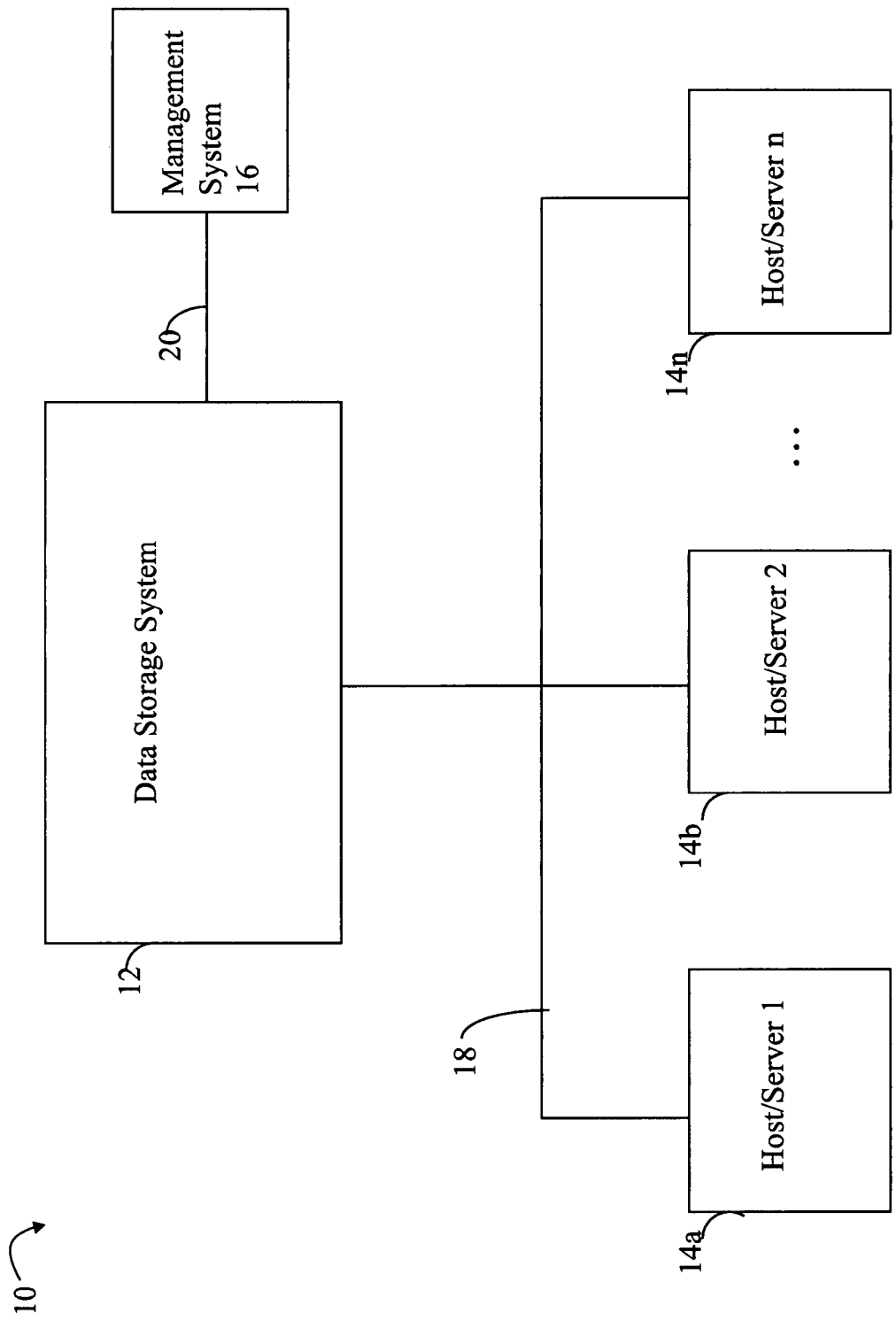
FIG. 1 is an example of an embodiment of a computer system that may utilize the techniques described herein.

Referring to FIG. 1, shown is an example of an embodiment of a computer system that may be used in connection with performing the techniques described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with configuring the data storage for use by the hosts in connection with techniques described herein. As an example in connection with an email application server component that may executed on the hosts 14a-14n, the data storage configuration tasks may include allocating storage for user accounts or mailboxes, specifying the devices (logical and/or physical) used to store the email data, specifying whether data replication is performed for disaster recovery, and the like. Techniques that may be used in connection with performing data storage configuration and configuration tasks are described in more detail in following paragraphs in order to provide ease of use to customers of the data storage system(s) 12.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein for processing a data storage configuration request.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

Described in following paragraphs are techniques that may be used to assist customers of a data storage system in connection with performing data storage services such as related to data storage system configuration, provisioning of data storage, and the like. The techniques herein are adaptable to the particular knowledge level of the user. The techniques are flexible and allow for implementation of best practices and defaults in an automated fashion which are customized for the particular application, user or customer, and/or underlying data storage system and environment to meet specific customer needs. As will be described in more detail, depending on the level at which a user interacts with the data storage system, different levels or amounts of automation of the best practices may be performed. The user may elect to bypass the automation of best practices or limit the amount of automation performed by interacting with the system at various levels.

Figure 2:
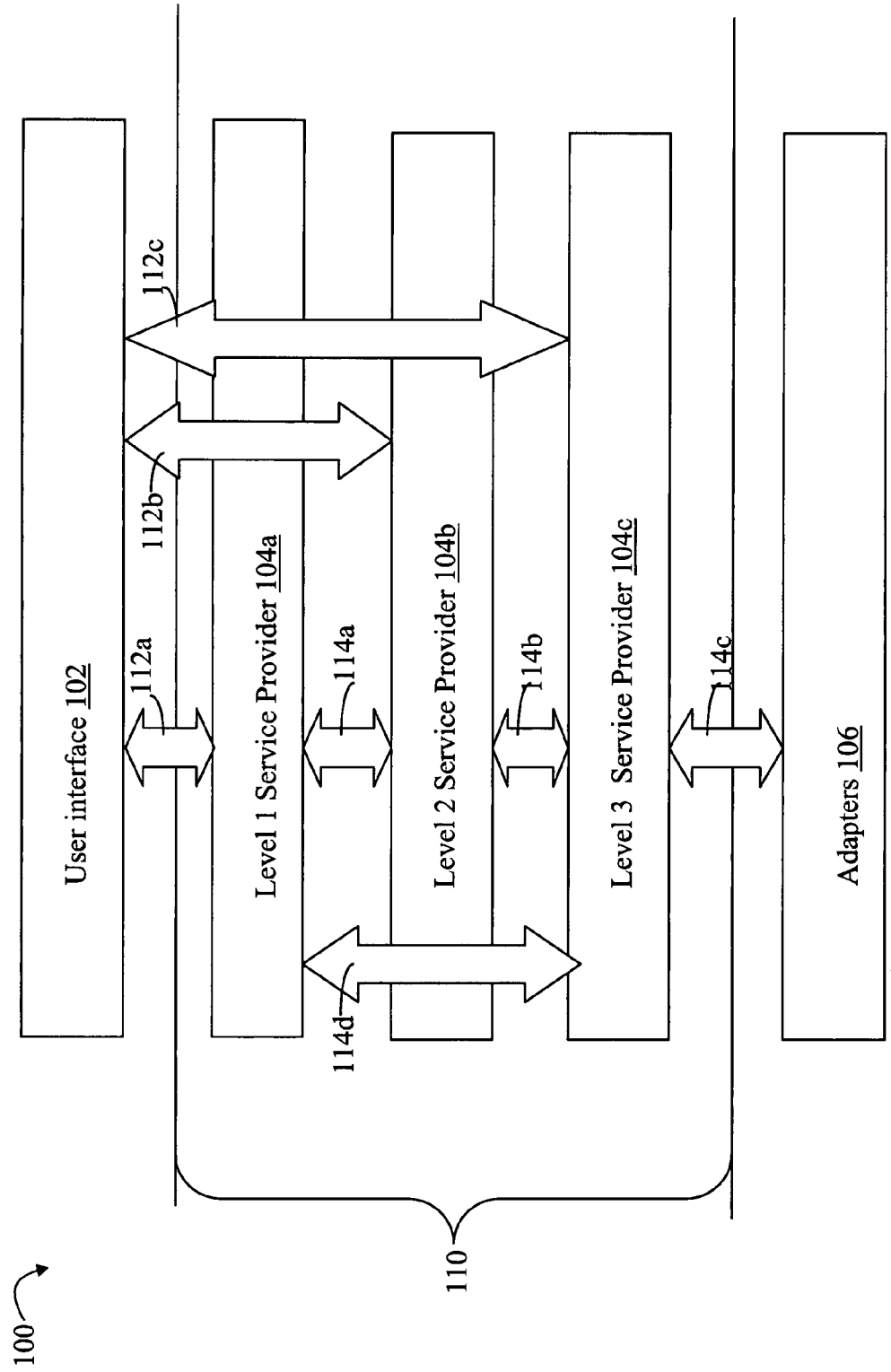
FIGS. 2 and 3 are examples of components that may be included on the data storage system for use in performing the techniques herein.

Referring to FIG. 2, shown is an example representation of components that may be included on the data storage system 12 for use in performing the techniques herein for data storage configuration. The example 100 includes a user interface 102, one or more levels of service providers 110, and adapters 106. In the example 100, the element 110 includes 3 service provider layers or levels 104a-104c. It should be noted that although 3 service provider levels are shown in FIG. 2, an embodiment may include any number of service provider levels.

The adapters 106 are used in connection with facilitating communications between the service providers, such as the level 3 service provider 104c, and other components. The different service providers included in the example 100 may be able to communicate directly with one another. However, when one of the service providers at one of the levels communicates with another component other than one of the service providers, an adapter may be utilized. An adapter may be characterized as a layer of software between one of the service providers, such as service provider 104c, and another component, such as a lower-level component invoked to implement data storage platform specific functionality. An adapter 106 may convert a service provider API to the API of another component. As an example, the service provider 104c may perform a call to an external component to create a file system. An adapter 106 may be used as an intervening layer between 104c and the external component in which the adapter 106 converts the API call from 104c to the API of the external component. The conversion may include, for example, mapping parameters between the API calls, performing multiple calls to the external component for the one API call from 104c, and the like. It should be noted that an adapter 106 may not utilized if such conversion is not needed.

The user interface (UI) 102 provides for one or more different types of user interfaces and associated data. For example, the UI 102 may provide support for a graphical user interface (GUI), command line interface (CLI), and the like, to support interactions between the data storage system 12 and the hosts 14a-14n of FIG. 1. Each of the different service provider levels of 110 may provide a different logical view and level of abstraction with respect to a data storage configuration task to be performed for an application executing on one of the hosts. In connection with the techniques herein, a user may interact through the UI 102 with any one of the different levels of service providers 104a-104c when performing data storage configuration requests. Each of the service providers of 110 may provide a different level of detail or abstraction with respect to the underlying operations and tasks performed on the data storage system in accordance with different levels of user sophistication and knowledge. As will be described in more detail below, the language or terminology, UI data (e.g., content or data used to populate the UI menus), and UI presentation or structure (e.g., commands presented or particular hierarchical menu structure) may vary in accordance with the particular level of service provider selected by the user. Thus, a user may interact with the data storage system at a variety of different levels when issuing data storage configuration requests for the same application. The UI may be customized for the particular level and application for which the request is performed.

In an embodiment, the UI 102 may be characterized a set of different user interfaces that may vary depending on the target user and associated user level at which the user interacts with the system. As described in more detail in following paragraphs, each level may provide a different user interface for a different level of user interaction and level of knowledge and sophistication. Each level may also be associated with a different level of automation of the best practices, for example, with users interacting at level 1 obtaining the greatest amount of automation of best practices and users interacting at level 3 obtaining none or minimal amount of automation. The UI 102 may provide multiple different user interfaces in accordance with the different levels allowing a user the option of connecting and interacting with the data storage system at any level. By allowing a user to select a level of interaction and automation, the techniques herein provide a user with a flexible approach to choose deeper levels and entry points (e.g., level 3) providing less automation and more detail as well as selection of other levels (e.g., level 1) when greater automation of best practices is desirable.

For example, level 1 service provider 104a may provide a beginner or most simplistic view of the data storage system and tasks performed for data storage configuration. Interaction with the level 1 service provider 104a requires the least amount of knowledge and may be geared toward interacting with users having minimal knowledge when performing a data storage configuration request by providing the greatest level of abstraction of the underlying system and operations performed. The language may be more non-technical in comparison to the interface language of other levels. As the level increases, so does the assumed level of knowledge of the user in connection with interactions. Level 3 service provider in the example 100 may be utilized by the most knowledgeable users providing a greatest granularity of control of all levels in connection with a data configuration request. Level 3 exposes more detailed information to the user than interactions at levels 1 and 2. As an example, a level 1 user may issue a data storage configuration request to provision storage for a number of mailboxes for storing data of an email application executing on one of the hosts. The level 1 user may specify a minimal amount of information in connection with the request such as only a number of mailboxes. A user may interface with the data storage system using a GUI and issue the data storage configuration request. The language and terminology of user interactions via the GUI may be customized for the level 1 user of the email application. In connection with the same email application, a more knowledgeable user may choose to issue a data storage configuration request via a GUI for a same number of mailboxes by interacting with level 3 service 104*c*. At level 3, the user provides more detailed information about the request regarding the underlying data storage device and how this data storage device is used by the application. To further illustrate, the level 3 data storage configuration request may specify the physical and/or logical devices upon which storage is allocated, provide vendor-specific attributes or settings, indicate a number and type of file created, and the like. In connection with the type of file created, this may be particular to the email application. A file may be a database or a log file. The log files are used to keep a record of transactions taking place and may be used in connection with recovery operations. The database files hold mailbox stores such as email data. In connection with the user communicating with the level 1 service provider, such detail is not provided and defaults may be specified by the data storage system when implementing the level 1 data storage configuration request. The defaults may be customized for the particular application.

When implementing the request, the level 1 service provider may communicate with one or more other level service providers such as 104*b* and 104*c*. Different defaults for the particular application may be used by service providers 104*b* and 104*c*. For example with reference to the level 1 request for the email application described above, the level 1 service provider 104*a* may communicate with the level 2 service provider 104*b*. Provider 104*b* may then communicate with the level 3 service provider 104*c* to implement the request and allocate the requested storage along with specifying other defaults such as, for example, a default level of data protection. The service provider 104*c* may communicate with other data storage system hardware and/or software when implementing the configuration request.

As illustrated in the example 100, a service provider at a level n may generally communicate, directly or indirectly, with one or more other service providers at levels lower than level n when processing a data storage configuration request. A user may select the level of interaction and the user's data configuration request is received at the data storage system by the UI 102. The UI 102 in turn communicates with the appropriate level service provider to initiate the request. Furthermore, a request received at a first level can result in multiple requests to a lower level to perform an operation. For example, a user may connect to the data storage system 12 at level 1 104*a*. In response, the level 1 service provider 104*a* may issue more than one request to provider 104*b*. In turn, each request to provider 104*b* may result in one or more requests to provider 104*c* which, in turn, communicates with adapters and other code modules to perform the requested operation.

The data storage configuration request may identify the user (e.g., by user identifier or other authentication information), the application for which the request is being made, and any user selections or input parameters.

In one embodiment, the service providers 104*a*-104*c* may be code modules which are included in the same appliance. Each of the service providers 104*a*-104*c* may provide a published interface or API (application programming interface). A first service provider at level n may issue a request of another lower level service provider by issuing an API call to the lower level service provider. The API may also be used to facilitate communications between the UI 102 and the different level service providers of 110. As described in more detail in following paragraphs, an API call from a first service provider to a second service provide may use rules or mappings to map the data received by the first service provider to the appropriate API call with parameters and any defaults in accordance with the received data. Thus, the rules or mappings may be used to map between levels of abstractions of the different service providers.

Although an embodiment may have all service providers 110 located in the same appliance or other component, the service providers may be characterized as remotable. One or more of the service providers may be located on different components having connectivity so that the API calls between service providers may be remote API calls as well as local API calls (e.g., service providers on same component). As an example, an embodiment may have multiple data storage systems included in a network. Each of the service provider may be located on a different data storage system.

An embodiment may determine the level at which a user interacts with the system using a variety of different techniques. With reference to FIG. 2, a user may be allowed to interact at any of the 3 levels. The menus may be directed to a level 1 user. The user may select whether to interact at a lower level by selecting further detailed menu options providing more detailed information at lower levels. As a variation, a user may have associated roles or permissions. If the user does not have the associated roles or permissions to perform operations or view such detailed information associated with particular levels, the associated menu options, wizards, and the like, may not be displayed or may otherwise be disabled when interacting with the particular user.

As a variation to the foregoing, the levels exposed to a user may be limited in that a user may not be allowed to interact with one or more lower levels. For example, user interaction with the data storage system may start at level 1 and provide wizard or other menu options for more detailed selection by the user for level 2. However, information and interactions at level 3 may never be exposed if the product is intended only for a certain level of users or a particular target market. In other words, the capability to drill down and interact may be limited to only levels 1 and 2 but not level 3.

An embodiment may also utilize user preferences to determine the initial or default level of interaction and exposure. For example, user preference settings stored on the data storage system or on the host may specify a default level used for the user interface menus, language, and the like. No further detailed buttons or drill down capabilities may be provided via the interface unless the user changes his/her preferences and selects to apply such preferences.

In such an embodiment, the user interface may be presented from a viewpoint of the user preferences having content, structure and an interface language/terminology in accordance with the selected level. The user preferences may be stored as configurable parameters or options on the appliance or remotely located, such as on the host, and used by the appliance. For example, the configuration file for the users may be stored on the host. An agent on the host may read the configuration file and communicate the preferences to software on the appliance providing data for populating and presenting the user interface. A user may change the preferences via menu options, directly editing a configuration file, and the like. As a user gains experience and knowledge, a user may select to interact at a lower level for some or all requests.

Figure 3:
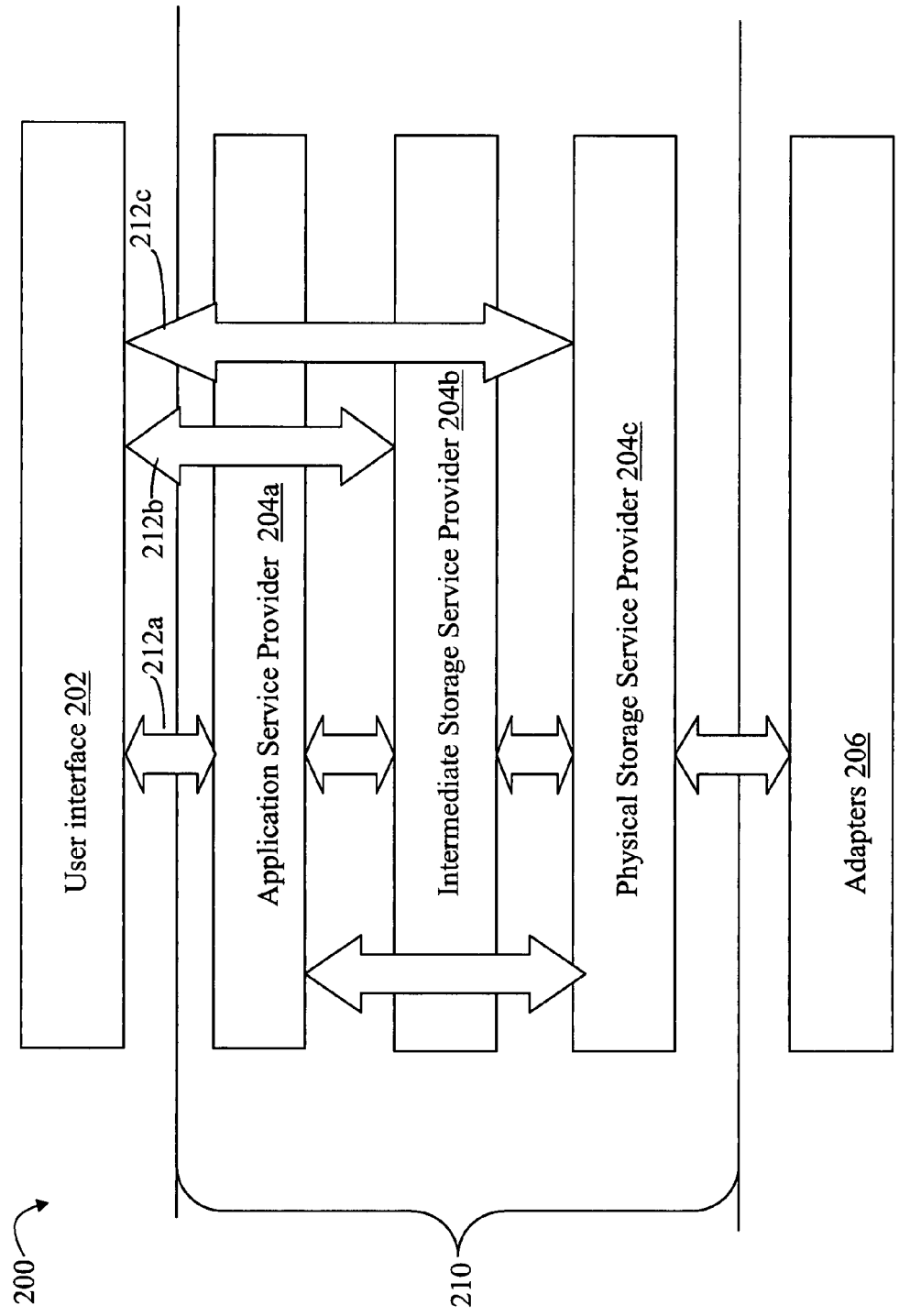

Referring to FIG. 3, shown is another example representation of components that may be included on the data storage system 12 for use in performing the techniques herein for data storage configuration. The example 200 is a more detailed illustration setting forth a particular instance of the different service providers and levels that may be included in an embodiment. Elements 202 and 206 are similar, respectively, to elements 102 and 106. Element 210 includes 3 service providers: application service provider 204a, intermediate or generic storage service provider 204b and physical storage service provider 204c. With respect to a level hierarchy, 204a may correspond to level 1 service provider 104a of FIG. 2, 204b may correspond to level 2 service provider 104b of FIG. 2, and 204c may correspond to level 3 service provider 104c of FIG. 2.

The application service provider 204a may have an application-specific focus and provide a level of abstraction customized for an application such as, for example, a particular email application, law office application or medical office application, as well as a class of related applications, such as a multiple email applications. When interacting with provider 204a for a particular application, the interface language may vary with the application. For example, if the application is a law office application, the interface language, menu options, and the like, may be tailored to the law profession. Similarly, a medical office application may utilize an interface language, menu options, and the like, familiar to the medical office. As such, the application service provider 204a may use one set of rules or mappings for each application to implement the application specific best practices for the user level. A first set of rules for the medical office application may be used to map the user input parameters using medical office terminology to parameters for the appropriate API calls for other service providers 204b and/or 204c. A second set of rules for the law office application may be used to map the user input parameters using law office terminology to parameters for the appropriate API calls for other service providers 204b and/or 204c. The user connecting to the data storage system at the application service provider level 204a may be provided with a user interface customized for the selected level and application to perform a requested data storage configuration.

The intermediate storage service provider 204b may be an intermediate or second level of user interaction. As illustrated, the provider 204a may communicate with 204b when implementing a request for data storage configuration. In one embodiment, a user connecting to provider 204b may be provided with a generic level of interaction which may not be tailored for the particular application. In other words, the same language and user interface may be presented to a user for multiple applications such as the medical application or law office application. As a variation to the foregoing, the service provider 204b may be customized for each application and provide for a more detailed level of exposure that varies per application.

The physical storage service provider 204c provides the most detailed or greatest level of exposure of the underlying data storage system. The provider 204c may be customized for the particular storage vendor and associated options. The user interface for a user connected at level 3 to service provider 204c may include menu options and terms particular to the underlying storage vendor and the more knowledgeable user. For example, the user may specify particular devices, RAID levels and techniques, file types, SCSI and iSCSI terminology, and the like.

The best practices and the automation of the best practices as described in more detail in following paragraphs may be customized for a particular application and the particular data storage system and environment. In other words, the best practices may vary in accordance with the particular application as well as the underlying data storage system and environment. For example, different practices may be preferred for a same application as the underlying data storage system changes. In such an instance, for example, there may be a first set of mappings used for mapping level 204a information to level 204b providing automation of best practices for a user connecting at level 204a for the application. The same first set of mappings may be used even if the data storage system differs. Other mapping rules may be used to map level 204b information to level 204c information in accordance with the best practices for the underlying data storage system. As the data storage system changes, the mappings used for level 204b-level 204c mapping may change although the same first set of mappings may be used.

Figure 4:
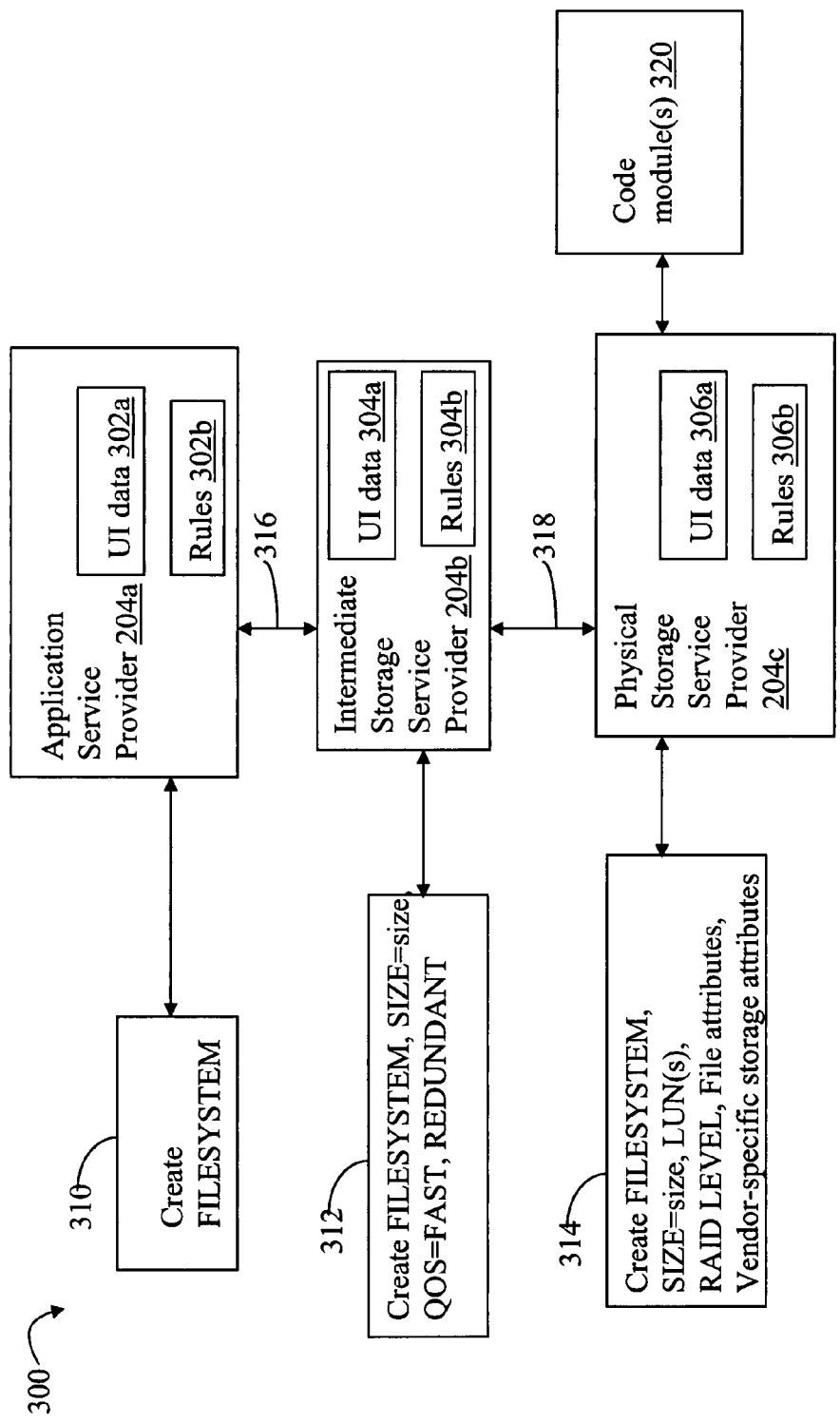
FIGS. 4 and 5 are examples illustrating the mapping between the different service provider layers or user levels.

Referring to FIG. 4, shown is an example illustrating how the different service providers of FIG. 3 may be used to perform the mapping between levels to perform a data configuration request, and also provide different levels of user interaction.

Elements 204a, 204b, and 204c correspond to the different levels of service providers described in connection with FIG. 3. Elements 310, 312 and 314 represent the information obtained via the UI at the various levels and service providers. Element 310 represents the information obtained for a user connected at level 1 to service provider 204a. Element 312 represents the information obtained for a user connected at level 2 to service provider 204b. Element 314 represents the information obtained for a user connected at level 3 to service provider 204c. Information obtained by a user at level n may be subsequently passed on via an API call to one or more other lower level (e.g. greater than n) service providers in order to perform the user request.

Element 312 may also represent the information communicated by the service provider 204a after the provider 204a applies mapping rules 302b to 310 resulting in an API call of the form as illustrated in 312. Element 314 may represent the information communicated by the service provider 204b after the service provider 204b applies mapping rules 304b to 312 resulting in an API call of the form as in 314

With reference to the example 300, if a user interacts with the system at level 1, the application service provider 204a obtains the data included in 310 which is passed on in form 312 to provider 204b as illustrated by 316. Provider 204b in turn maps data from form 312 to the form of 314 to provider 204c as illustrated by 318. If a user interacts with the system at level 2, the intermediate service provider 204b obtains the data included in 312 and passes the data of 312 to provider 204c in the form represented in 314. If a user interacts with the system at level 3, the physical storage service provider 204c obtains the data from the UI in the form 314. In this example, the provider 204c may implement or execute the one or more operations to perform the request indicated by 314 by invoking one or more other code modules 320. The code modules 320 may communicate with other components on the data storage system to perform the requested task.

In one embodiment, the UI 202 of FIG. 3 may query each service provider to obtain the appropriate UI data 302a, 304a and 306a via API calls in accordance with a user selected level of interaction using any one of a variety of different techniques as described herein and known to those skilled in the art. The UI data 302a, 304a and 306a may be used to populate the menus and other UI elements that may be displayed to a user.

The example 300 illustrates the user inputs for creating a file system for an application with interactions at the various levels 1-3. Element 310 illustrates the input received from the most basic user level 1 in which the user may enter a command to create a particular files system. The file system created with user level 1 interactions uses all default options specified via mapping rules and API calls to levels 2 and 3. For level 2, the parameters input from the user or received via mapping and an API call from level 1 are illustrated in 312. By default, parameters related to size (e.g., SIZE=size), device speed, (e.g., QOS=FAST, wherein QOS is "quality of service") and data protection (e.g., REDUNDANT) are specified. At level 2, there is a level of abstraction from the underlying data storage system but the attribute characteristics may be specified. For level 3, the parameters input from the user or received via mapping and an API call from level 2 are illustrated in 314. At level 3, details regarding the underlying data storage system, such as devices, RAID levels, vendor-specific attributes, which file system (e.g., NFS, CIFS) or block storage, and the like, are specified. For example, level 2 indicates that storage for the file system is to be located on a FAST device. Level 3 mapping rules map the abstract FAST attribute to the particular device (e.g., LUN(s) on the data storage system that may be characterized as FAST with respect to other data storage devices). As more physical devices and/or logical devices added which are also FAST, different LUNs may be used and specified by the mapping rules 304a without any change in the data of 312. Thus, data obtained from users interacting at level 1 and 2 need not change as the underlying data storage system changes when devices are added/removed.

In connection with the bottom most level service provider 204c or service provider associated with the greatest level of user knowledge and detail, 204c may optionally not include and utilize rules 306b. An embodiment may have the language of the user interface map directly with low level calls to code modules to implement the request. In other words, the language terms and parameter values specified by the user at level 3 may not require mapping in order to be utilized by the system.

As will be appreciated by those skilled in the art, the examples, such as those of FIG. 4 and following, may be simplistic for purposes of illustration of the techniques herein. At lower levels, there may be greater amounts of detail and complexity in order to provide automation of the best practices.

Figure 5:
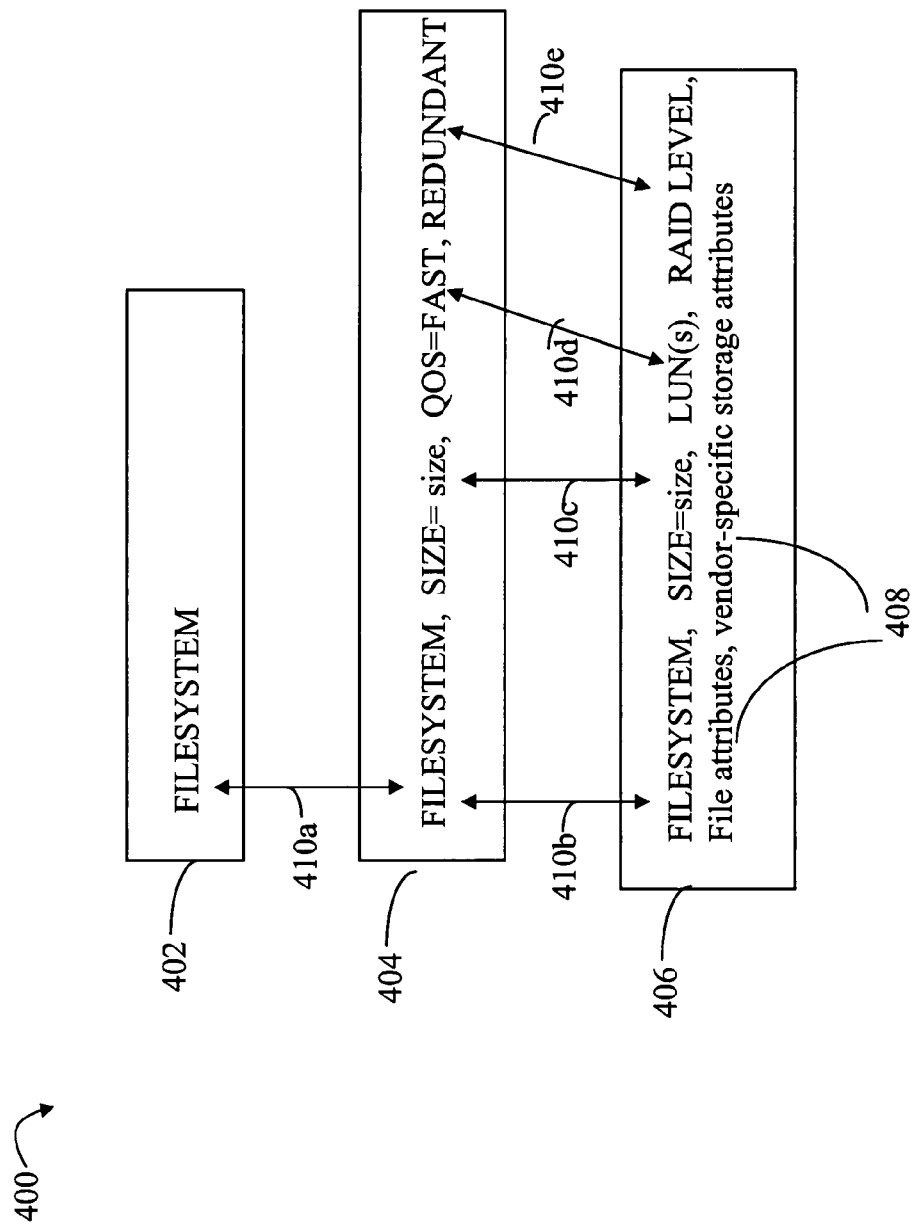

Referring to FIG. 5, shown is another representation of the mapping of the different parameters that may be performed by the rules of the different service providers. The example 400 further illustrates the parameter mapping between levels. Element 402 represents the data obtained by service provider 204a. Element 404 represents the data obtained by service provider 204b via direct user interaction or from provider 204a. Element 406 represents the data obtain by service provider 204c via direct user interaction or from provider 204b. The FILESYSTEM type is passed 410a as a parameter from level 1 to level 2, and then passed to level 3 410b. Level 1 mapping rules may define defaults based on best practices for the particular application as indicated by the parameters SIZE=size, specifying a default size for the file system, and QOS=FAST, REDUNDANT, specifying default quality of service (QOS) parameters for a fast device with redundancy. Level 2 mapping rules map the parameters of 404 to parameters of 406 as indicated by 410c, 410d and 410e. Additionally, level 2 mapping rules introduce additional default parameter values as indicated by element 408 when interacting with level 3.

As described herein, the user can connect and interact with the data storage system at various levels to perform data configuration requests. The user may select the level of interaction that can vary with each request. The mapping rules provide for specifying any defaults that may be needed to implement the request. When implementing a same data configuration request for different applications, the defaults introduced at one or more levels may vary with application. The mapping rules at the different levels allow for implementation of best practices while insulating and abstracting the details from the user. For example, the rules used by the application service provider of FIG. 3 may be used to implement application specific best practices. The rules used by the intermediate storage service provider may be used to implement best practices with respect to the underlying data storage system. As such, using the techniques herein, a framework may be defined which provides customized interfaces for different user levels of interaction with respect to a particular application when performing a data service for data storage configuration for the particular application. Rules included in the framework may be selected for use depending on the application, data service, and defined set of one or more user groupings. A user grouping may be defined as a set of one or more user levels and associated service providers. For example, FIG. 3 illustrates a single user grouping of 3 levels with associated service providers 204a, 204b and 204c. A data service may be defined as a particular service performed in connection with a data storage configuration request. Example data services are provided elsewhere herein.

Figure 6:
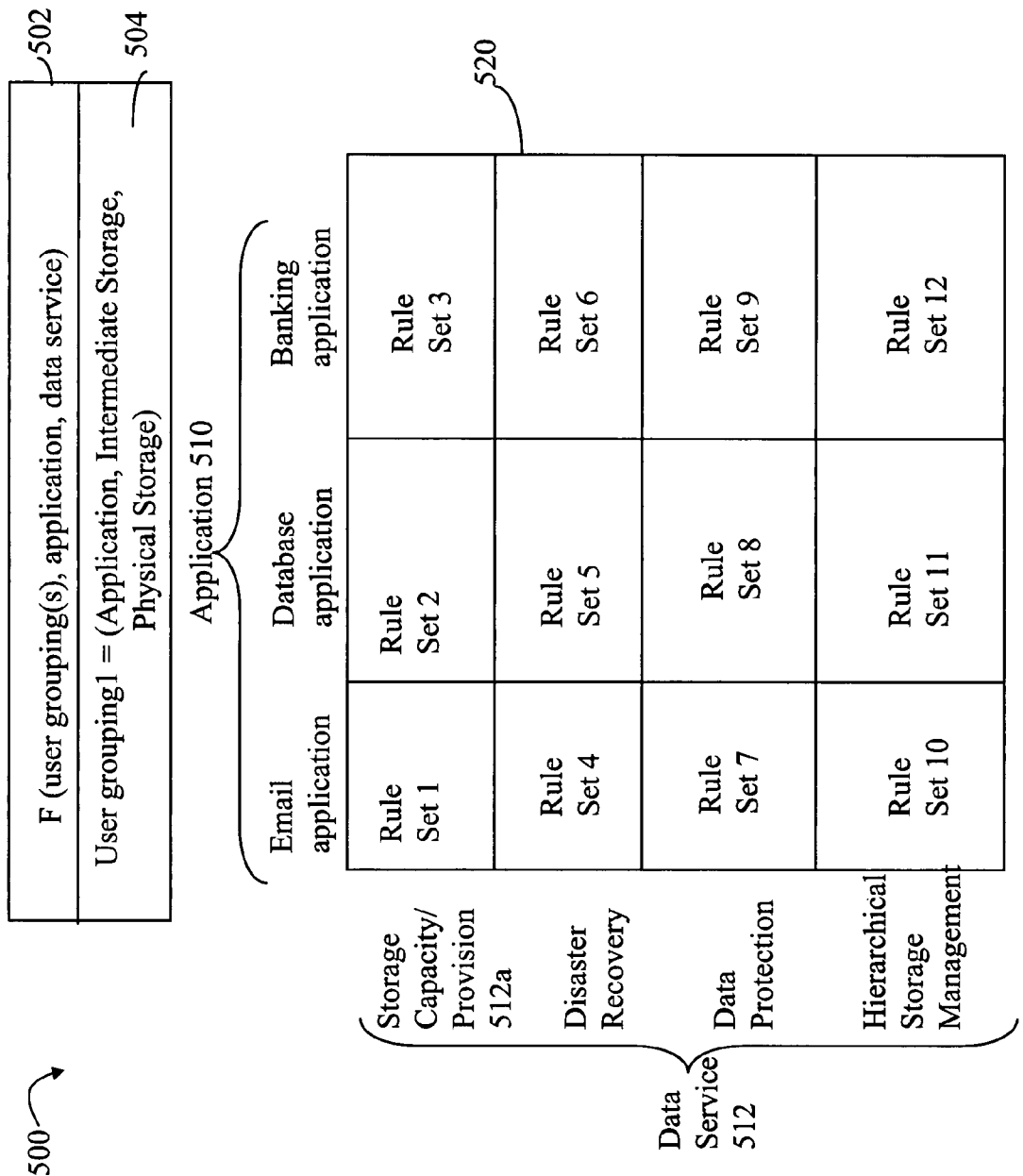
FIGS. 6 and 10 are example representations of a parameterized function and matrix that may be used in connection with rule set selection.

Referring to FIG. 6, shown is a function that may be used to select a particular rule set. The example 500 illustrates a 3-dimension mathematical function, F, in 502 representing in a parameterized form a function that may be used in connection with selecting a rule set. As described in more detail elsewhere herein, a rule set may be defined as a set of rules or mappings used by the different service provider levels for a specified user grouping. Element 504 indicates the user grouping defined in the example of FIG. 3 having 3 user groups or levels.

For purposes of illustrating the 3-dimensional function, the first dimension, the user grouping, has a value as indicated by the user grouping 1 of 504. The rule sets available for selection with the user grouping 504 are illustrated by element 502. Element 520 is a matrix of specified rule sets from which one is selected for a particular set of values for the function F of 502. Other 2 dimensional matrices may be defined for different user groupings. The matrix 520 uses a row index to indicate the rule sets for use with a particular data service 512 and a column index to indicate the rule sets for use with a particular application 510. Generally, data services may include any service that transforms or utilizes the data and/or the storage of the data. Exemplary data services include storage capacity/provisioning, disaster recovery, data protection, and hierarchical storage management. Storage capacity/provisioning data service may include operations to allocate storage. A data configuration request, such as a request to create a file system described elsewhere herein, may be provided by the storage capacity/provisioning data service 512a. The disaster recovery data service may perform services to plan for possible drive failures. Disaster recovery services may include, for example, data replication. Data protection services may include, for example, providing data backups, encryption services, and the like. Hierarchical storage management services may provide services for managing the storage devices. Hierarchical storage management services may include, for example, moving data between different types of data storage devices such as between a fibre-channel data storage disk and an ATA (Advanced Technology Attachment) disk, between one of the foregoing disks and a tape, and the like. Other examples of services that may be included in an embodiment are retention services which focus on preventing deleting data until a certain time period and/or automated deletion of data after a specified time period, and classification services which may index content as stored to allow for other operations such as retrieval of content based on subsequent search criteria, categorization of data content, and the like. Example application of 510 may include an email application, a database application, and a banking application as well as the law office application and medical office application described elsewhere herein. It should be noted that a same rule set may be specified for more than one entry in the matrix. An entry in the matrix may not specify a rule set indicating that the particular combination of application and data service for the user grouping (e.g., parameters of F) is not supported. Other data services, as a category or included in a broader data service category, may provide for snapshots, cloning, migration, recovery, and the like.

It should be noted that application 510 can refer to a particular application category including one or more applications. For example, a column of 510 may refer to email applications as a category including multiple email applications from different vendors. However, a column of 510 may also be associated with a particular instance of an email application, such as Microsoft Exchange.

It will be appreciated by those skilled in the art that the number of dimensions of the function may vary from what is illustrated in FIG. 6. For example, if there is only a single user grouping for a set of applications and associated data services, then a 2-dimension or 2 parameter function may be used. Additionally, as illustrated in more detail in following paragraphs, the number of dimensions or parameters for the function may be more than 3.

Figure 6A:
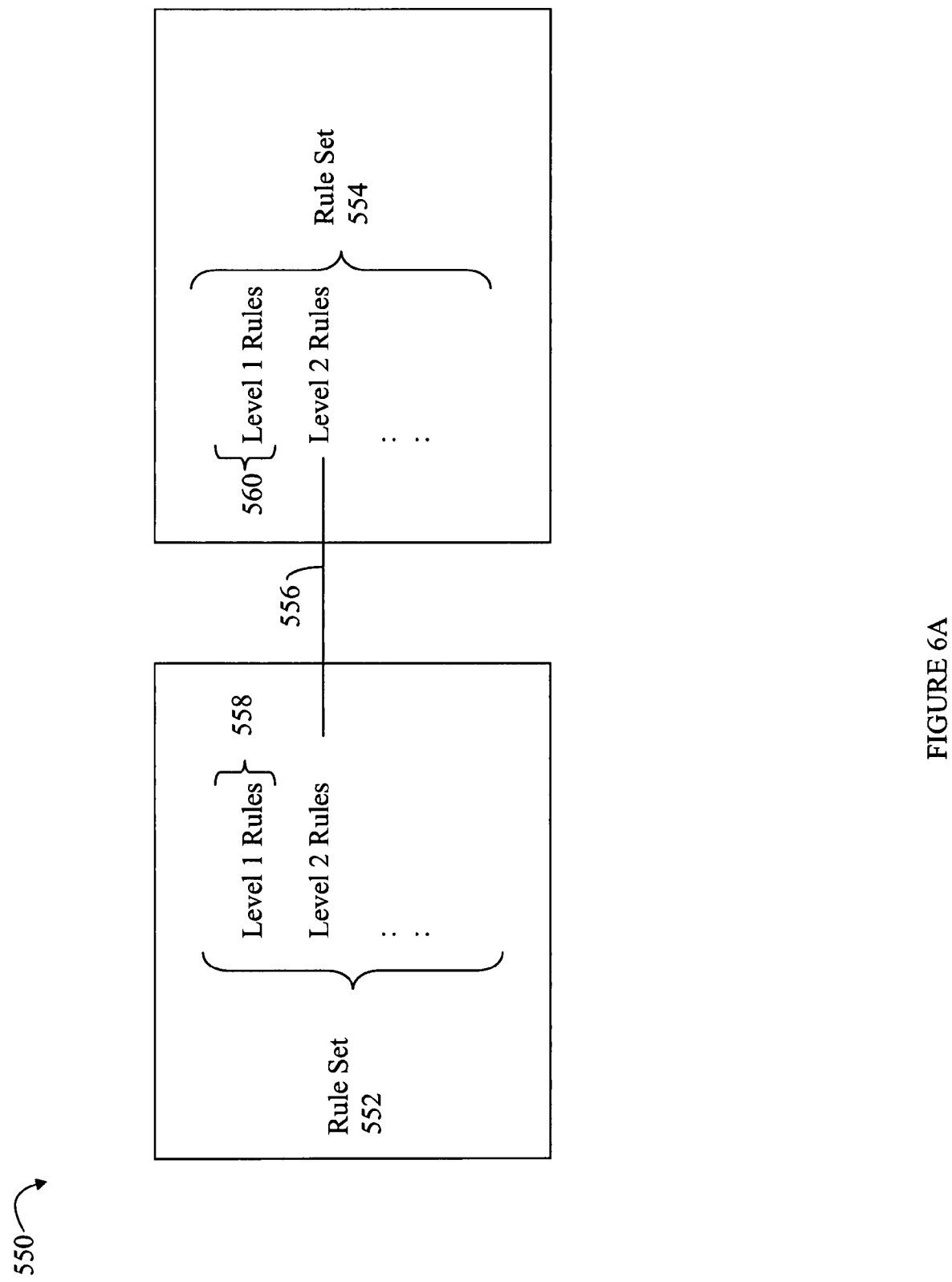
FIG. 6A is an example illustrating rules comprising a rule set.

Referring to FIG. 6A, shown is an example of a rule set for two applications. The example 550 includes a rule set 552 and another rule set 554. Each of the rule sets may be identified by an identifier in one entry of the matrix 520 of FIG. 6. The rule set 552 comprises rules used by each level service provider. For example, 552 includes level 1 rules 558 and level 2 rules, as well as other rules used by other level service providers. Rule set 554 includes level 1 rules 560 and level 2 rules. In this example, the level 1 rules of the two rule sets 552 and 554 may be different. However, the level 2 rules may be the same for both rule sets as indicated by 556. As an example described elsewhere herein with respect to the medical office application and the law office application in an embodiment having 3 user levels, a different set of level 1 rules may be used to map the different language and terminology of the user interface for each application and a same set of rules may be used to perform the level 2 to level 3 mapping. In such case, one entry in a matrix similar to 520 corresponding to the medical application may specify a rule set represented by 552 and another entry in the matrix corresponding to the law office application may specify a rule set represented by 554.

Figure 7:
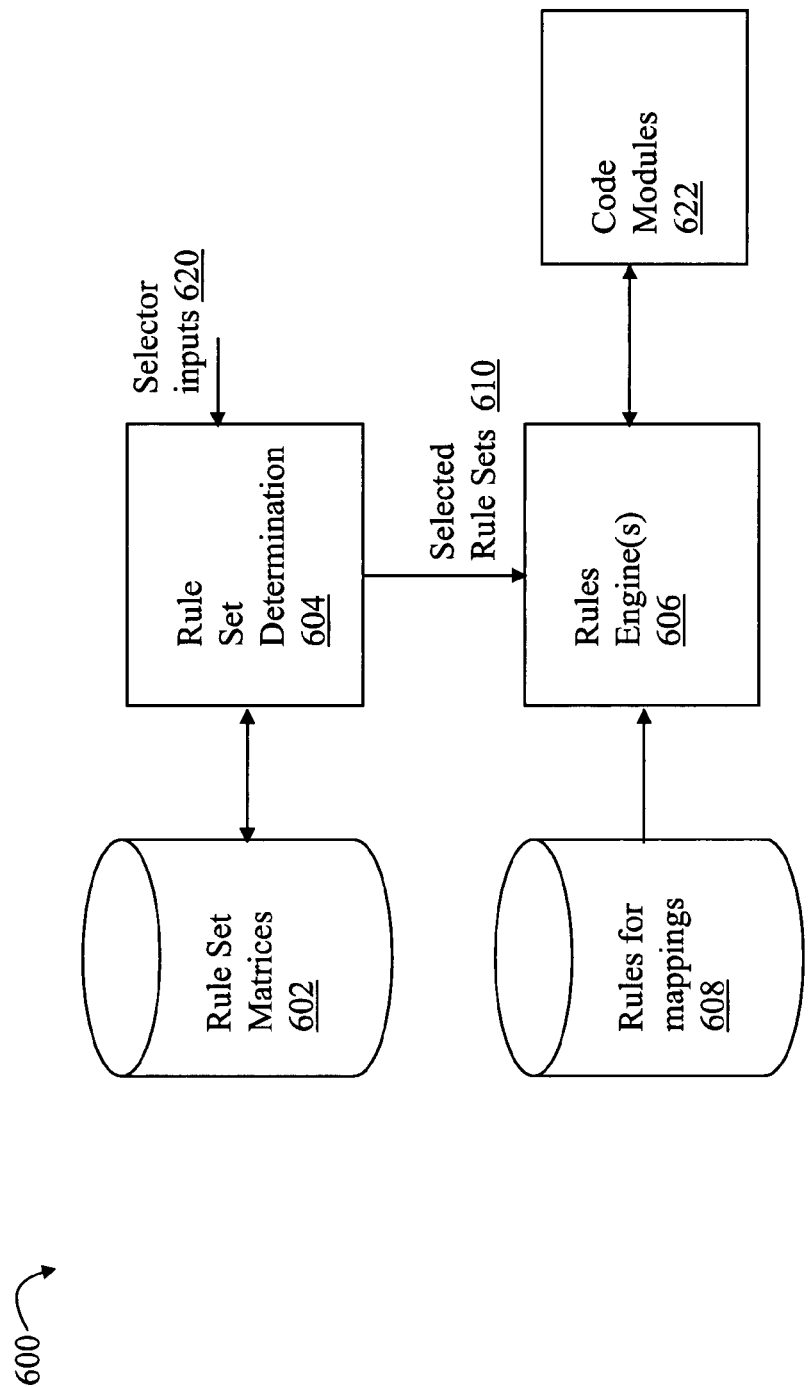
FIG. 7 is a data flow diagram illustrating processing that may be performed in connection with the techniques herein.

Referring to FIG. 7, shown is a data flow diagram of processing that may be performed by components in accordance with the techniques herein. In the example 700, the rule set determination process 604 selects a rule set from one of the rule set matrices 602 based on the selector inputs 620. With reference to FIG. 6, the selector inputs 620 may indicate values for the parameters of the function F. Based on the particular parameter values, the rule set 610 is selected and used by the rule engine 606. The element 610 may identify the particular rule set as illustrated in FIG. 6A specifying the mapping rules used by the different levels of service providers for the user grouping instance included in 620. Based on 610, the rules engine 606 retrieves the rules used in the mappings from the data store 608. Each service provider may include one or more of the rules engines 606 to perform the mappings using rules for the level of the service provider. A rules engine may invoke one or more other code modules 622, such as an API of another service provider, once a rule has been applied.

It should be noted that elements 602 and 608 may represent a data store, such as a file or memory location, at which the matrices and rules, respectively, are stored.

In connection with the rule set determination processing 604, the selector inputs 620 used to select the rule set may be determined, in whole or in part, implicitly, based on the user selections and user input parameters. For example a user may select a menu option to perform a requested task such as provision storage for use with mailboxes for an email application. Thus, the "application" parameter can be determined for the function F of FIG. 6. Based on the requested task, the particular "data service" may be determined. There may be one user grouping of 3 user levels defined for the "application" and "data service" instances so the rule set may be selected. The user may input one or more parameters via a GUI. Based on the one or more parameters, the user level of interaction may be determined. For example, user level 1 may be the only level to have a single parameter. If only a single input parameter is received from the user, it may be determined implicitly by the UI to interact with the level 1 service.

At a later point, the user may navigate to a different menu level and issue a different data storage configuration request. Accordingly, a different rule set may be determined.

It should be noted that each instance of a data service and application may have a different number of user levels and associated service providers. For example, a first data service for an application may have 3 levels and a second data service for the same application may have 5 levels or 2 levels. Furthermore, in connection with implementing a request for a first data service, one or more calls may be made at different levels to other data services. For example, a user level 1 request to perform a storage capacity data service operation may use rule set 1 to perform a first call to the data protection service (e.g., backup) which uses rule set 7.

Figure 8:
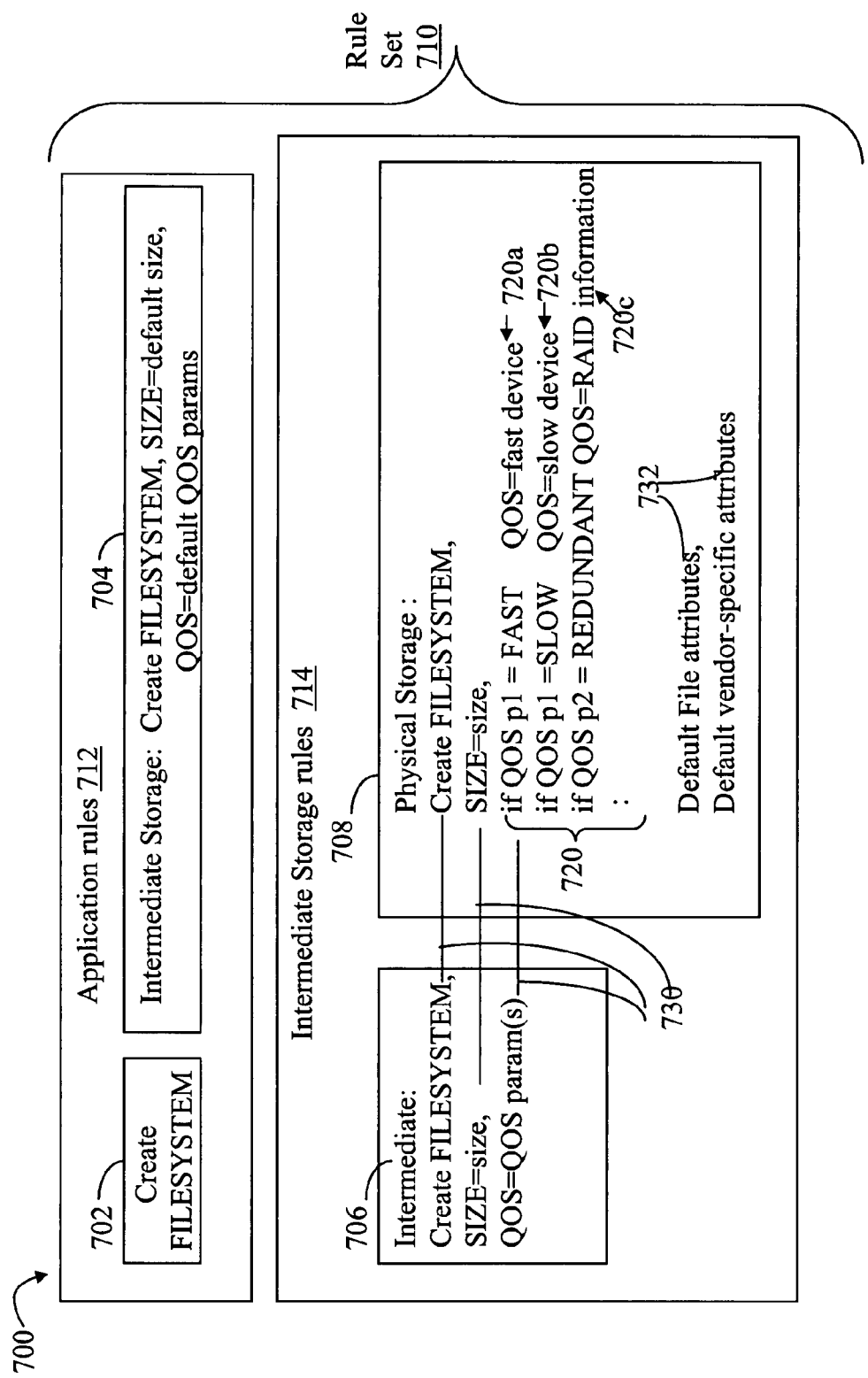
FIGS. 8 and 9 are more detailed example of mapping rules.

Referring to FIG. 8, shown is a more detailed representation of the mapping rules as may be utilized in an embodiment. The example 700 is a further illustration of the example described in connection with FIGS. 4 and 5. The rule set 710 illustrates rules 712 used for the level 1 to level 2 (application service provider to intermediate storage service provider) mapping and the rules 714 used for the level 2 to level 3 (intermediate storage service provider) mapping.

In connection with the description of FIG. 8, reference is made to the elements of FIG. 5.

The rules 712 indicate that the data of 702 is mapped to the data of 704. Elements 702 and 704, respectively, represent the data from 402 and 404 of FIG. 5. Element 704 indicates that the service to be invoked is the "intermediate storage" service provides using the API "Create" with the parameters indicated. The rules 714 indicate that the data of 706 is mapped to the data of 708. Elements 706 and 708, respectively, represent the data from 404 and 406 of FIG. 5. Element 708 indicates that the service to be invoked is the "physical storage" service provides using the API "Create" with the parameters indicated. Lines 730 indicate the particular parameter mapping and portions of the rule used for the mapping. In connection with 720 for determining the QOS parameters, the rule may include conditional statements and other language elements for implementing the rules. The particular language syntax may be parsed by the rules engine in connection with performing the mapping as described herein. The rules may be evaluated at runtime so that the rule language elements may use variables, expressions, statements, and the like, which can be evaluated at runtime in accordance with the user inputs, values specified by a calling service provider, variables indicated a current state of the data storage system, and the like. In this example 700, the element 720 includes statements which may be conditionally evaluated to determine the particular one or more QOS parameters passed in the call to the physical storage service provider. The variable QOS represents a list of parameter values. The example 720 includes 3 if statements which are evaluated based on particular values specified for the first QOS parameter, p1, and the second QOS parameter, p2. For example, if the QOS parameters have values as indicated in 404 of FIG. 5, the first if statement 720*a* evaluates to true and "fast device" is specified as one of the QOS parameters in the level 2-level 3 call. The second if statement 720*b* evaluates to false. The statement 720*c* evaluates to true and "RAID information" (e.g., such as RAID level, RAID devices used, etc.) is added to the QOS parameters in the level 2-level 3 call. Element 732 indicates additional default parameter values specified in the level 2-level 3 call.

In connection with the rules, a policy may be used to determine one or more default values. For example, in connection with provisioning storage for a level 1 a user request, the lower level mapping rules may specify a particular default LUN set used until those LUNs reaches a certain capacity and then a different LUN set may be used. The parameter values in the rules representing the particular LUNs may be modified during operation of the system. The LUN set and the capacity may be included in a policy. The rules may include expressions for runtime evaluation of the amount of consumed storage on the specified LUN set and may use alternately specified LUN sets depending on the consumed capacity. Another way this may be implemented is to have the rules specify a dynamic parameter having a value which is determined at runtime such as by having the rules engine obtain a dynamic parameter value at a current point in time during operation of the data storage system. The dynamic parameter values may be updated by other software which performs monitoring or some other function in accordance with determining the particular parameter.

As a further example illustrating use of the techniques herein, different QOS parameters may be provided as defaults using the rule sets for the same application. Different rule sets may be specified depending on the particular usage, user grouping(s), and the like, for the same application. For example, the same application may be used to provide services to two different groups of users to create a file system. With reference to FIGS. 5 and 8, both user groups may enter a command as in 702. However, the default mapping rules such as illustrated by 704 may vary with each user group. For example, a first set of rules used for a first group may create the file system on a FAST device with REDUNDANT storage as illustrated in 404 of FIG. 5. However, a second set of rules used for the second user group may create the file system on a SLOW device without providing REDUNDANT storage. Thus the rules used for the second group may be represented as:

FILESYSTEM, SIZE=size, QOS=SLOW, NO REDUNDANCY rather than as illustrated in 404 of FIG. 5. The rules may be used to customize the default QOS parameters and others for the same application depending on the particular usage and/or user group.

As illustrated herein, the techniques provide for use of rules processed by the rules engine. The rules are associated with a particular application and requirements or needs of the application as well as the particular storage capabilities of the underlying data storage system. Thus, an application's requirements may be mapped to the particular underlying data storage system capabilities using the rules. For example, 704 and 706 of FIG. 8 may represent the particular needs of the application for the usage. The application needs or requirements are mapped using the rules to the underlying data storage system capabilities such as, for example, represented in 708. Thus, the rules may be characterized as representing a configuration profile of the application for the particular usage on the data storage system.

Figure 9:
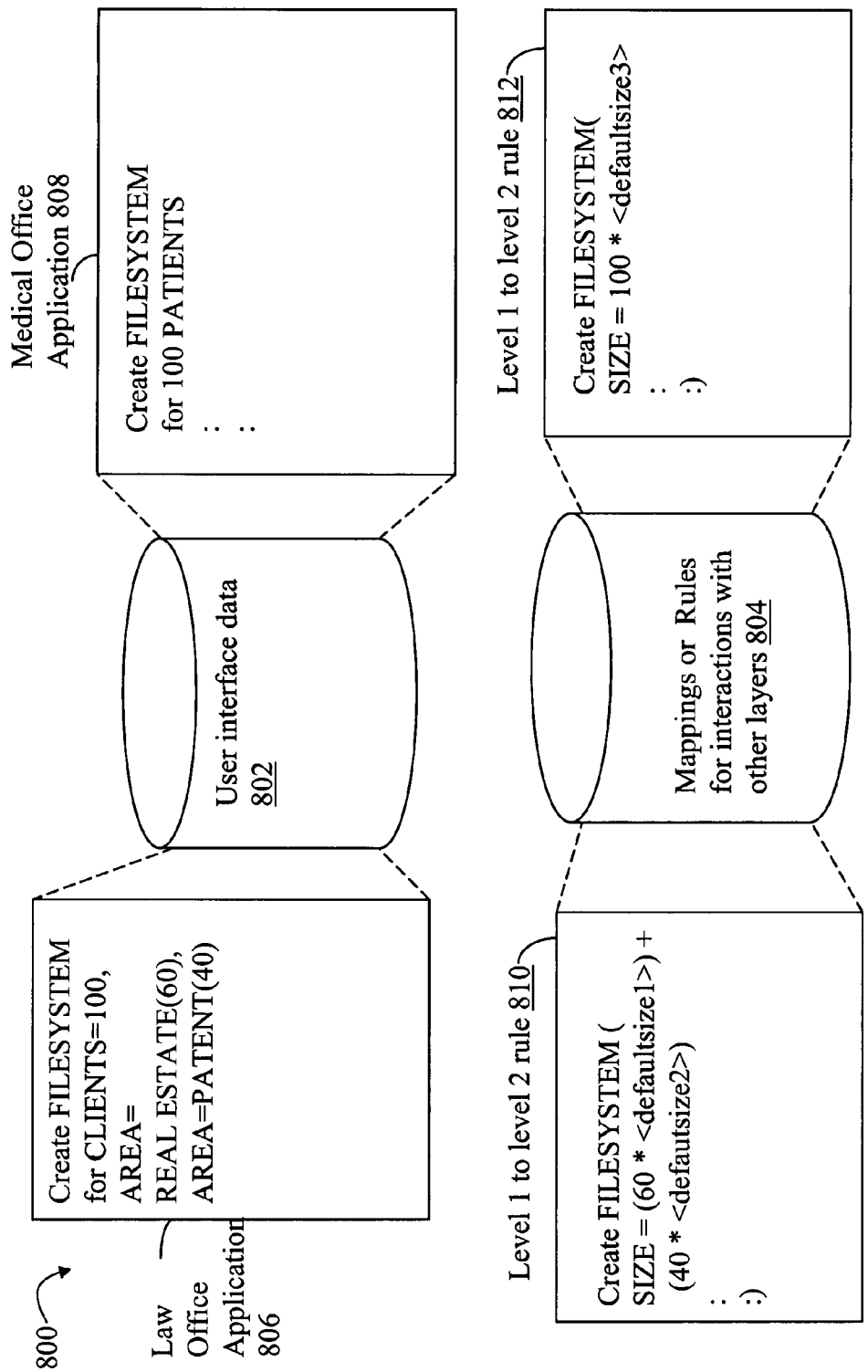

Referring to FIG. 9, shown is an illustration in more detail of rules that may be used in connection with the medical office application and the law office application as described elsewhere herein. As described above in connection with these two applications, mappings used by 204*a* of FIG. 3 may implement application best practices and mappings used by provider 204*b* may be the same for two applications The rules used by 204*a* may specify different mappings for the different user interface language terms. The medical office application and the law office application may each have a different set of terms for the UI language at level 1. Both applications may perform the same data storage configuration request to create a files system but the customers of each application may be in the different market segments, each market segment using different terminology. For example, a medical office may refer to a customer as a patient and the law office refers to its customer as a client. Requests may be made for both applications to create a file system of a particular size based on parameters particular to each application. Thus, the UI data provided by 204*a* for the medical office application for presentation to a user is different than the UI data provided by 204*a* for the law office application.

The example 800 includes user interface data 802 for the law office application 806 and the medical office application 808. The elements 806 and 808 may each represent the user input for a user request. As illustrated, both are requests to create a file system. In connection with the request 806, the size of the file system is determined based on the number of clients (100) and particular areas of law for which client data will be stored in the file system. The user request is provisioning storage for 100 clients, 60 of which are real estate and 40 of which are patent clients. In connection with the request 808, the size of the file system is determined based on the number of clients (100). Element 804 includes rules 810 and 812. Rule 810 is used for the level 1 to level 2 mapping for the law office application. Rule 812 is used for the level 1 to level 2 mapping for the medical office application. In 810, the total size of the file system is determined using a first size, defaultsize1, for each real estate client record to be stored in the file system, and a second size, defaultsize2, for each patent client record stored in the file system. In 812, the total size of the file system for the medical office application is based on defaultsize3. Rules 810 and 812 illustrate calls to the same API of the level 3 service in which the parameters of the call have different values determined by the level 1-level 2 mapping rules.

Figure 10:
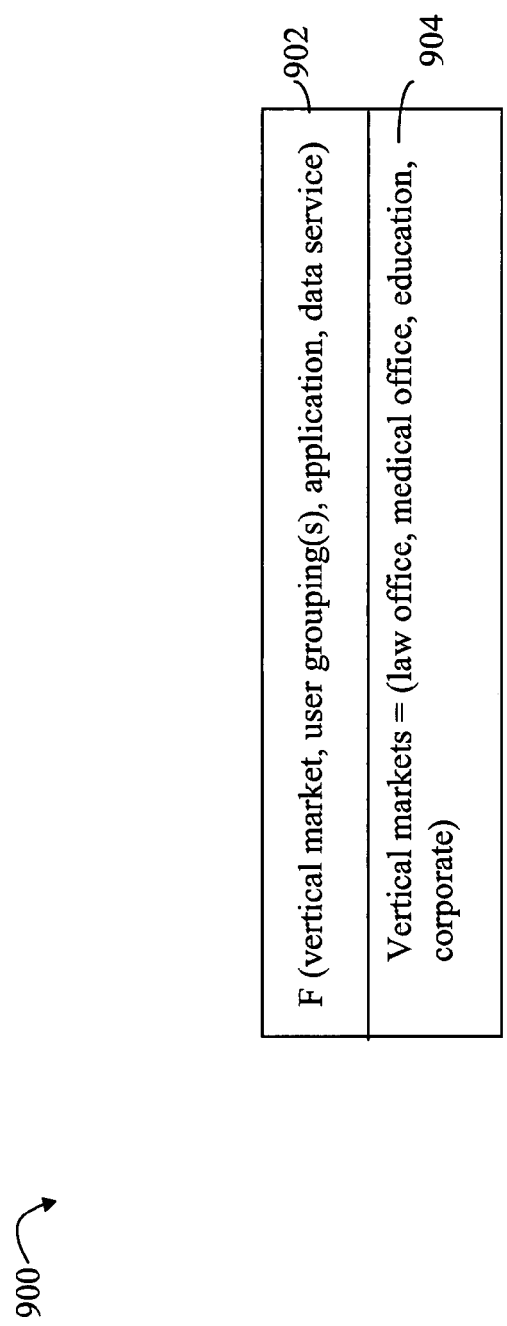

Referring to FIG. 10, shown is another example of a function that may be used to select a particular rule set. The example 900 illustrates a 4-dimension mathematical function, F, in 902 representing in a parameterized form a function that may be used in connection with selecting a rule set. Element 902 of FIG. 10 provides a fourth parameter, vertical market, in addition to those previously illustrated in FIG. 6. As a fourth parameter value that may be specified in connection with selecting a rule set, a vertical market may be specified such as indicated by 904. The vertical market may specify a particular specialty or niche market such as for a professional group. In one embodiment, a different rules set may be specified for the same combination of user grouping, application, and data service. For example, with reference back to FIG. 9, the different user interface data 802 and mapping rules 804 may be specified for the same application in which the user interface data is customized for interaction with the particular law and medical vertical market segments. As such, a different rule set may be used for the same application, user grouping, and data service in which only the level 1 to level 2 mapping rules may vary.

Figure 11:
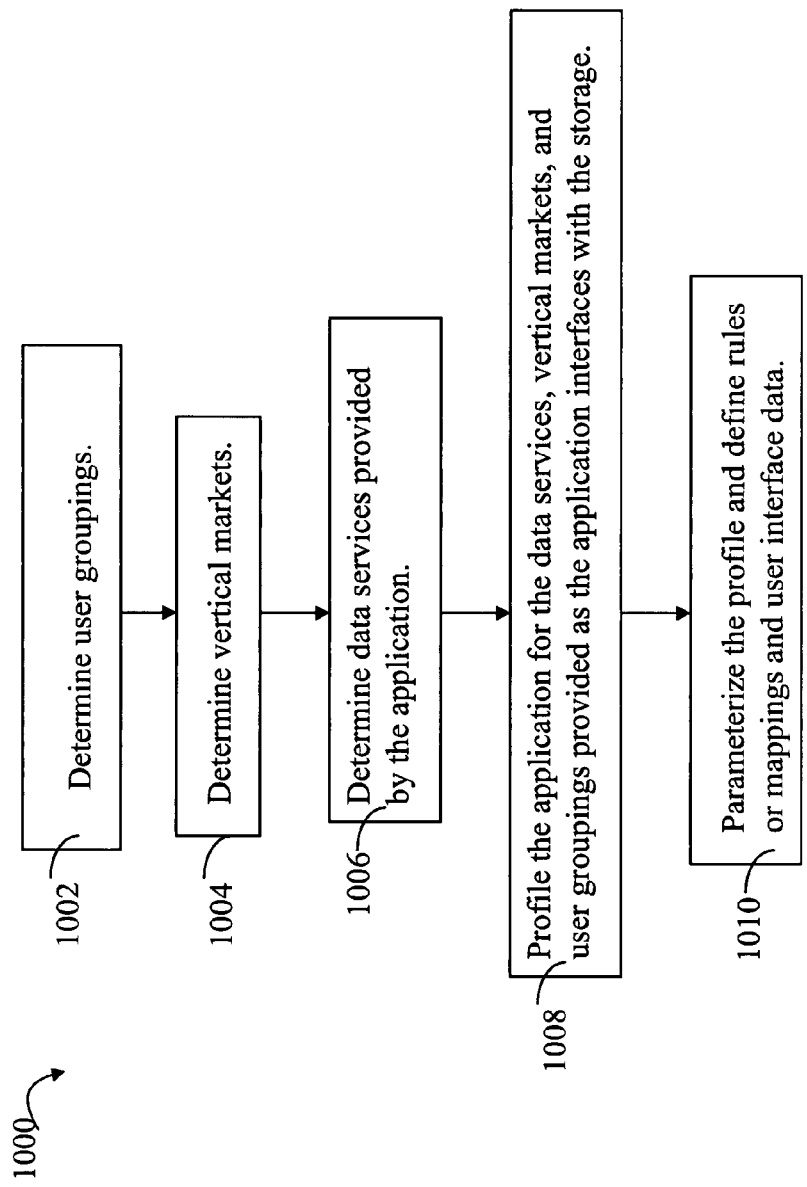
FIGS. 11 and 12 are flowcharts illustrating processing steps that may be performed in accordance with techniques herein.

Referring to FIG. 11, shown is a flowchart of processing steps that may be performed for each application for which the data storage system will perform processing using the techniques herein. The flowchart 1000 generally outlines analysis or the steps that may be performed for each application by developers implementing the techniques herein. At step 1002, the one or more user groupings and associated levels are determined. Each user groupings may specify a number of user interaction levels in which levels vary with the particular end users of the application. At step 1004, the vertical markets may be determined. Step 1004 may be an optional step or may result in only a single vertical market being determined of there is no rule set variation for different vertical markets. Similarly, with respect to step 1002, a single user grouping (e.g., single user grouping with 3 levels or layers) may be determined. At step 1006, the data services provided by the application are determined. At step 1008, the application may be profiled for the data services, vertical markets and user groupings determined in previous steps. The profiling may describe how the application interface with the underlying data storage when the data service is provided for the user groupings in the different vertical markets. Step 1008 may include determining the best practices for implementing a particular data storage configuration request. When performing requests for an application, the profiling describes how that request is to be implemented. Step 1008 may include, for example, determining application specific best practices as may be reflected in the UI language and terms and mapping rules for the different levels. The best practices may also vary with each storage vendor as reflected, for example, in the level 2-3 mapping rules described herein by specifying vendor specific attributes for each application or selected groups of different applications and/or services. At step 1010, the profiling information for the application from step 1008 may be expressed in a parameterized form using the rules, APIs, and functions as described herein to define the framework used by the data storage system in connection with processing a user request.

Figure 12:
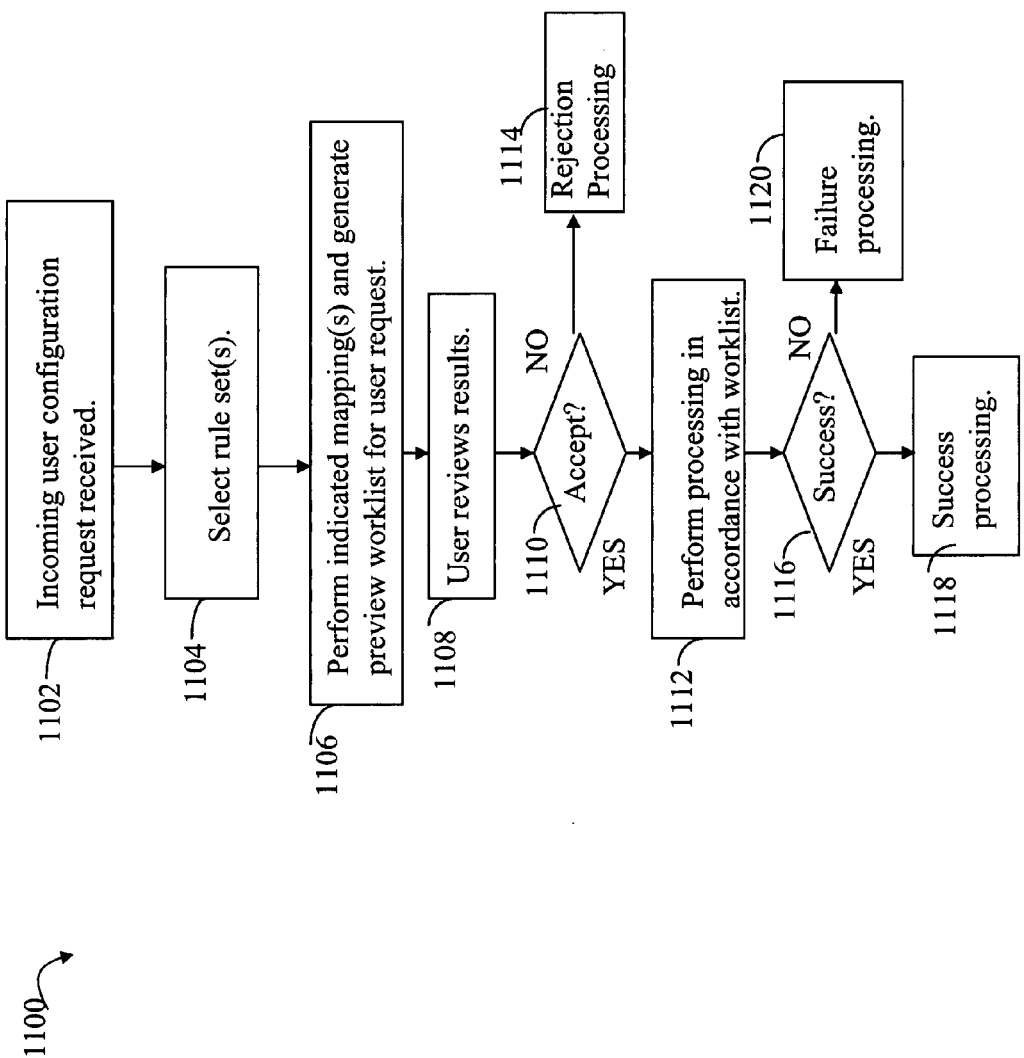

Referring now to FIG. 12, shown is a flowchart of processing steps that may be performed by a data storage system in connection with the techniques herein. At step 1102, an incoming user configuration request is received. At step 1104, one or more rule sets may be selected. In one embodiment as described herein, the request may not be executed immediately. Rather, as described in subsequent steps, the user allowed to preview a work list of the tasks to implement the request. At step 1106, the mappings to implement the request may be processed and the API calls between the different service providers may performed to generate the work list. Step 1106 may provide for determining the specific tasks that are to be executed to complete the request received. The specific tasks may be included in the work list and provided to the user for review at step 1108. At step 1110, the user may accept or reject the work list. If the user does not accept, step 1110 evaluates to no and rejection processing 1114 is performed. Step 1114 may include, for example, outputting a message that the request will not be performed and waiting for the next user input. If step 1110 evaluates to yes, control proceeds to step 1112 to perform processing to execute the request in accordance with the work list. At step 1116, a determination is made as to whether the work list tasks were performed successfully. If not, control proceeds to step 1120 to perform failure processing. Step 1120 may include a variety of different options such as, for example, attempting to retry the failed operation a number of times, outputting an error message, undoing or rolling back processing performed in the work list up to the failure point so that the data storage system is placed back in a state before the work list as executed, and the like. If step 1116 evaluates to yes, control proceeds to step 1118 to according perform success processing such as, for example, indicate completion of the request to the user with a message.

It should be noted that as part of the review process of step 1108, a user may examine the different objects and entities used to see the result or impact to the data storage system if the request is executed. For example, a level 1 user request provisioning storage for a file system may see how much storage would be allocated for the request if the request processing is executed. Such information may be important in evaluating the impact of the request and determining whether a user wants to execute the request.

In a specific application of the system and techniques described above, storage may be configured for use with an email application, and for storing mailboxes that include electronic mail messages and other information stored or used by the email application. In connection with the configuration processing, tasks may include allocating storage, specifying the logical and/or physical devices used for the storage allocation, specifying whether the data should be replicated, the particular RAID (Redundant Array of Independent or Inexpensive Disks) level, and the like. With such options in connection with performing the configuration conventionally, a customer or user may not have the appropriate level of sophistication and knowledge needed.

For example, a typical email application or server is characterized by requiring the storage system to record, as a condition precedent to the completion of a transaction, information related to that transaction. Assume an author or sender sends a message to a list of recipients. Some email applications respond by producing a write transaction to the mailbox for each recipient and to other locations, such as a "sent" file or folder. Each write transaction involves multiple transfers with the storage system. For example, the email application in some email systems writes a log entry for each write transaction directed to a recipient in the email data base and for other transactions. Each log entry identifies the sender, the mailbox address for the recipient and the source of the message. In some email systems this log entry is a first of two log entries and indicates that data is to be written to the specified location. After the log entry is successfully completed, the application copies the message reading it from its source and writing to the recipient's mailbox. When that transfer is successfully completed, the application produces another log entry as a second entry. The log entries for the transactions are important in the case of a system failure. In that situation, the log file containing all the log entries can be analyzed to determine which previous email messages have been written successfully and resend any messages that do not have both log entries. In the storage system, a single dedicated logical storage device, that may reside on one or more physical disk drives, normally stores all the log entries for the email application. Also each mailbox in the storage system may either reside on its own logical storage device or reside with other mailboxes on a logical storage device. In such applications, the connection between the application and the storage system is usually a shared resource, such as a resource that includes a SCSI interface. Once the transaction to write the log device is sent, the storage system and application are essentially disconnected until the log device completes recording the log entry. Then the log device reconnects so that the host application can complete the transaction or continue to perform added task functions. Such a disconnection and reconnection also occurs with write transfers and certain other transactions. In email systems with many users, writing entries to the log device can produce a bottleneck particularly when a single email message is written to a large number of recipients on an email list so that a large number of write operations are directed to the log device. Thus, proper configuration of the storage system for use with the email application is important; otherwise, response times increase and can become evident in the form of prolonged response times for the user of the host applications.

In one embodiment, the one or more data storage systems 12 of FIG. 1 may be an appliance with hardware and software for hosting the data storage of an email application executing on the hosts 14*a*-14*n*. The appliance may include one or more storage processors and one or more devices upon which data including mailboxes is stored. The appliance may include software used in connection with storing the mailbox data of the hosts on the appliance and also software used in connection with configuring the data storage for use by the hosts in connection with techniques described herein. In particular, in connection with an email application server component that may executed on the hosts 14*a*-14*n*, the data storage configuration tasks may include allocating storage for user accounts or mailboxes, specifying the devices (logical and/or physical) used to store the email data, specifying whether data replication is performed for disaster recovery, and the like.

Figure 13:
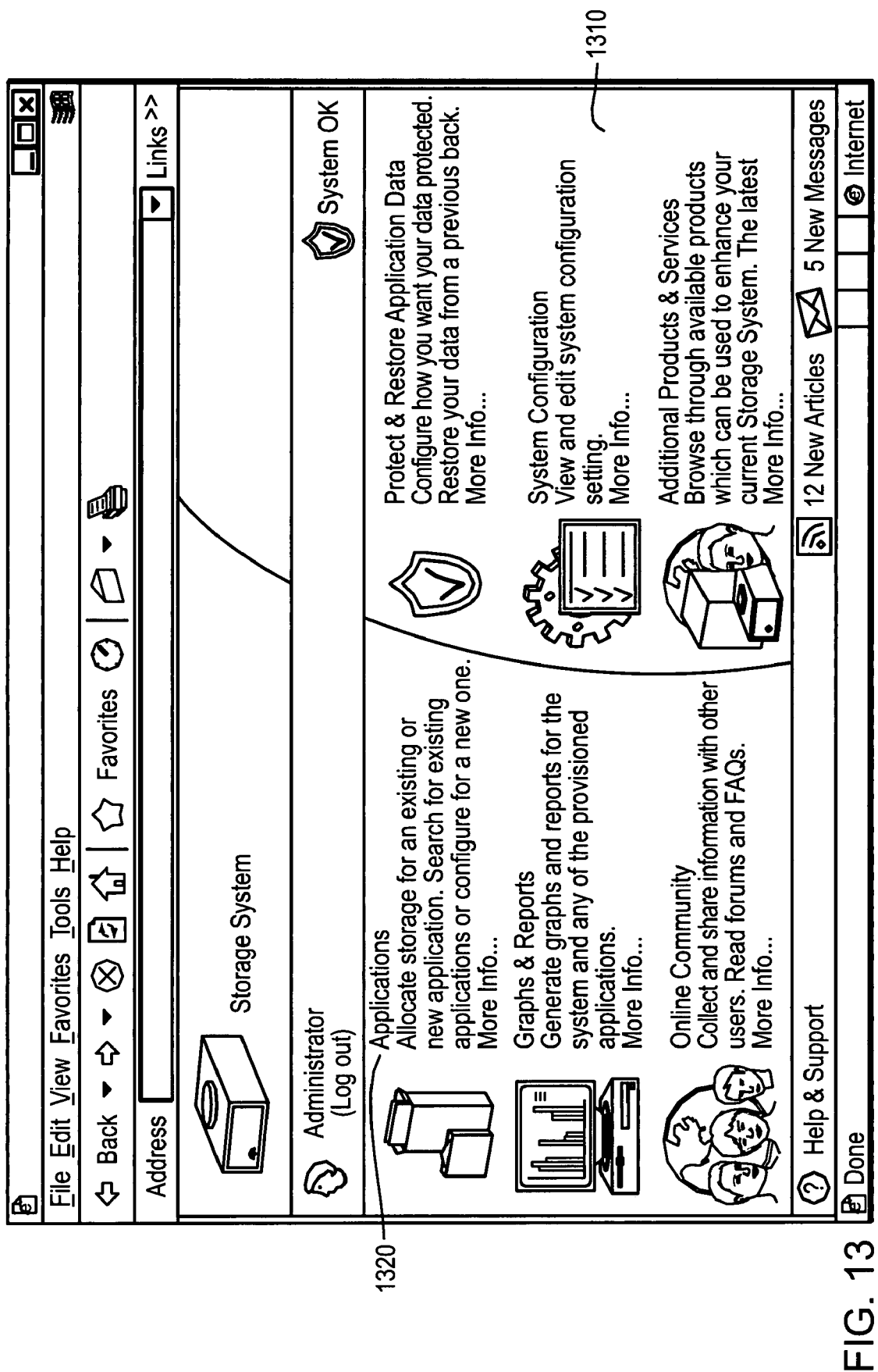
FIGS. 13-16 are illustrations of user interface screens for use with techniques herein.
Figure 14:
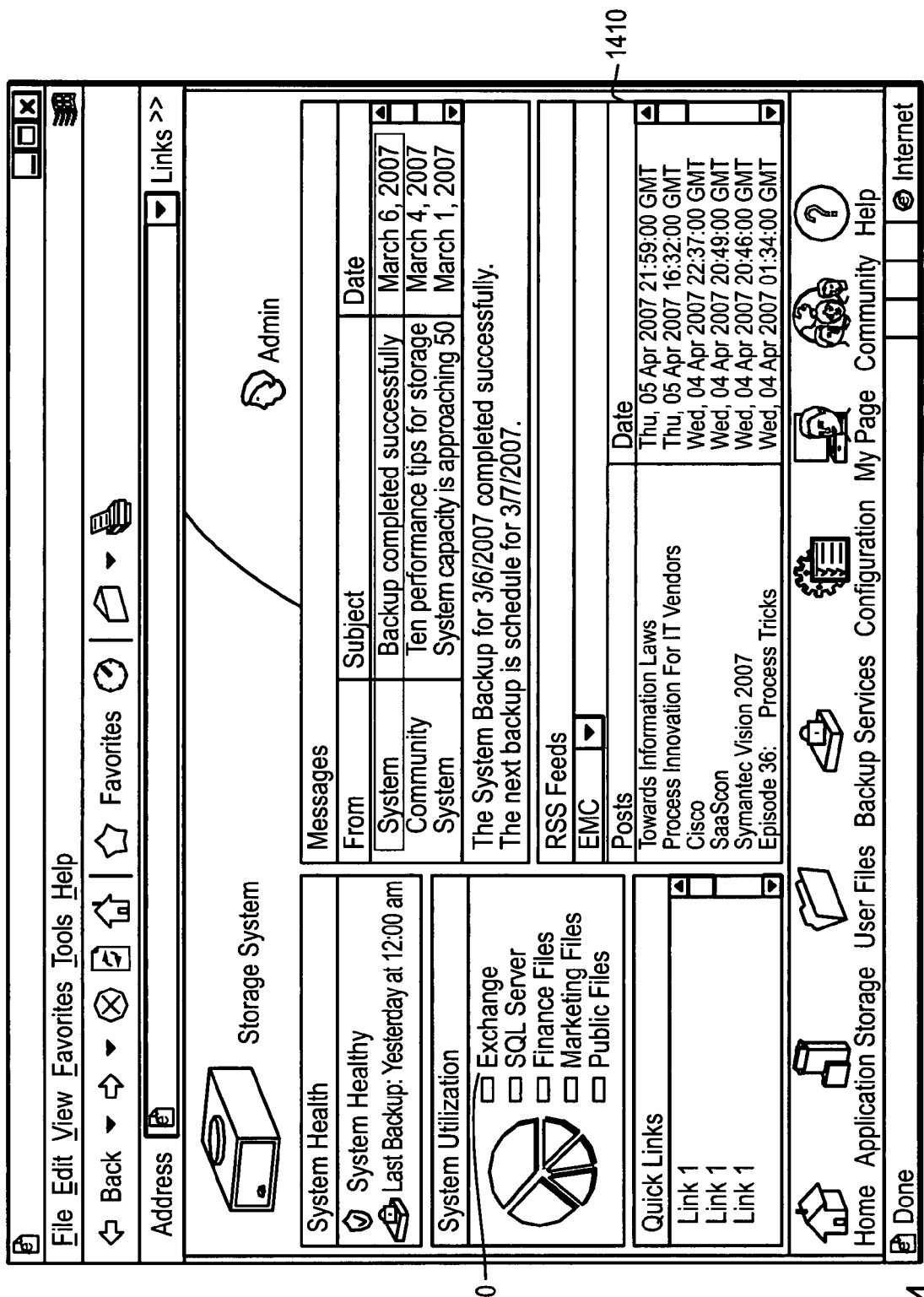
Figure 15:
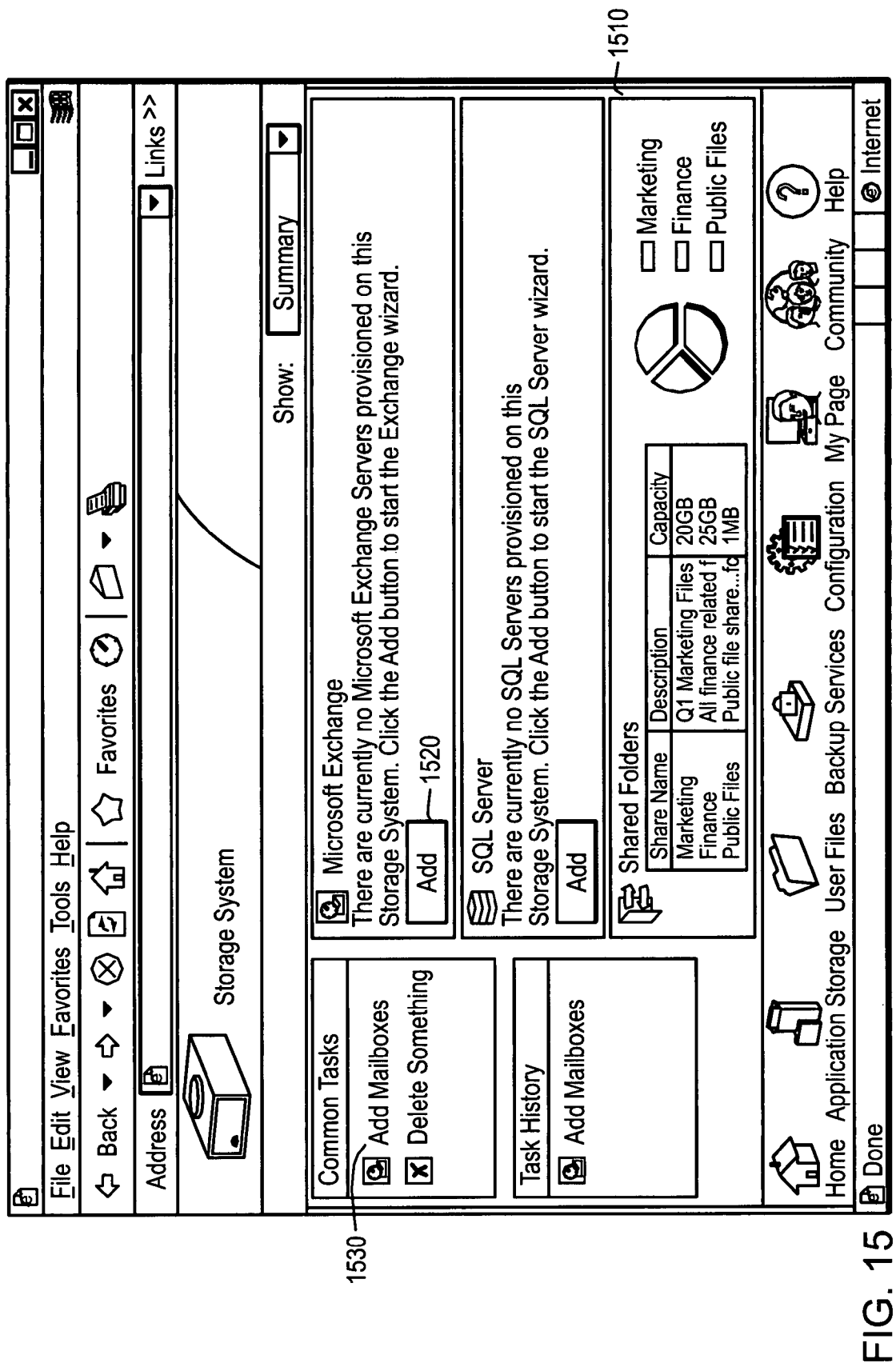
Figure 16:

FIGS. 13-16 illustrates example user interface screens for use in configuring storage for an email application. The screens may be provided in any of many different ways, including by a Web server application hosted at the data storage system so that the administrator can use a conventional Web browser to interact with the screens. FIG. 13 illustrates example administrator screen 1310 having an "applications" selection 1320 by which the administrator may cause storage to be allocated for a new or existing application. FIG. 14 illustrates example storage system screen 1410 having a system utilization portion 1420 depicting current allocations to an email application ("Exchange"). For a system in which email provisioning has not yet been performed, FIG. 15 illustrates an example configuration screen 1510 by which the administrator can make a first selection 1520 to provision storage for an email server ("Exchange Server") and a second selection 1530 to provision storage for mailboxes. FIG. 16 illustrates an example user information screen 1610 which allows the administrator to provide information about users of the email application.

For example, a level 1 user may use screen 1610 to issue a data storage configuration request to provision storage for a number of mailboxes for storing data of an email application executing on one of the hosts. As shown in FIG. 16, the level 1 user may specify a minimal amount of information in connection with the request such as only a number of mailboxes. A user may interface with the data storage system using screen 1610 and issue the data storage configuration request. As shown in FIG. 16, the language and terminology of user interactions may be customized for the level 1 user of the email application. In connection with the same email application, a more knowledgeable user may choose to issue a data storage configuration request via a GUI for a same number of mailboxes by interacting with level 3 service 104*c*. At level 3, the user provides more detailed information about the request regarding the underlying data storage device and how this data storage device is used by the email application. To further illustrate, the level 3 data storage configuration request may specify the physical and/or logical devices upon which storage is allocated, provide vendor-specific attributes or settings, indicate a number and type of file created, and the like. In connection with the type of file created, this may be particular to the email application. A file may be a database or a log file. The log files are used to keep a record of transactions taking place and may be used in connection with recovery operations. The database files hold mailbox stores such as email data. In connection with the user communicating with the level 1 service provider, such detail is not provided and defaults may be specified by the data storage system when implementing the level 1 data storage configuration request. The defaults may be customized for the particular email application.

When implementing the request, the level 1 service provider may communicate with one or more other level service providers such as 104*b* and 104*c*. Different defaults for the particular email application may be used by service providers 104*b* and 104*c*. For example with reference to the level 1 request for the email application described above, the level 1 service provider 104*a* may communicate with the level 2 service provider 104*b*. Provider 104*b* may then communicate with the level 3 service provider 104*c* to implement the request and allocate the requested storage along with specifying other defaults such as, for example, a default level of data protection. The service provider 104*c* may communicate with other data storage system hardware and/or software when implementing the configuration request.

The application service provider 204*a* may provide a level of abstraction customized for a particular email application, as well as a class of related applications, such as a multiple email applications. When interacting with provider 204*a* for a particular email application, the interface language may vary with the email application. For example, the interface language, menu options, and the like, may be tailored to Web based email or client software based email. As such, the application service provider 204*a* may use one set of rules or mappings for each email application to implement the application specific best practices for the user level. A first set of rules for the Web based email application may be used to map the user input parameters using Web browser terminology to parameters for the appropriate calls for other service providers 204*b* and/or 204*c*. A second set of rules for the client software based email application may be used to map the user input parameters using client software based terminology to parameters for the appropriate calls for other service providers 204*b* and/or 204*c*. The user connecting to the data storage system at the application service provider level 204*a* may be provided with a user interface customized for the selected level and email application to perform a requested data storage configuration.

Thus, storage may be allocated and configured for the appropriate email application. For example, in at least one implementation, the storage system may be configured so that certain types of email application data are stored at specific respective logical storage devices, and the storage system may further be configured so that the completion of tasks associated with different email application transactions with one logical storage device are conditions precedent to the completion of other transactions. Specific tasks related to the one logical device may be given priority over tasks related to all other logical storage devices. Reconnect tasks may be given the highest priority with reconnect tasks from the one logical storage device being given the highest priority. A second category of tasks related to the one logical storage device may be given priority over all other tasks except reconnect tasks. All other tasks may be given a priority below that of the first and second task categories.

An embodiment may implement the techniques herein using code executed by a computer processor. For example, an embodiment may implement the techniques herein using the rules, rules engines, and the like, using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

The foregoing provides a flexible approach for automated implementation of best practices that can be customized in accordance with the particular application, data service, and/or data storage system. The best practices may vary with application as well as the particular data storage system. A user may select a level of interaction with the system in which the level selected varies the assumed knowledge or user sophistication, level of detail, and level of automation for the particular application. The user may select a level, such as level 1, to obtain a greater level of automation of best practices customized for the particular application. A user may also select to obtain a lesser level of automation of best practices as the user knowledge level and sophistication increases. The selected level may be associated with a particular user interface, level of automation and interaction with the data storage system for performing data services for a particular application. The automation of the best practices may be implemented using a variety of different frameworks and infrastructures. The exemplary one set forth herein uses a rule-based system although it will be appreciated by those skilled in the art that others are possible to implement the techniques set forth herein.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in configuring data storage for electronic mail application, the method comprising:
providing a user interface to allow a user to issue a data storage configuration request to provision storage for an email application, the user interface being customized based on a user sophistication level, wherein the user sophistication level is selectable by the user from a set of user sophistication levels comprising first and second user sophistication levels, the first user sophistication level corresponding to greater automation and less detail than the second user sophistication level; and
based on the data storage configuration request, communicating with a service provider to implement the data storage configuration request, the implementing of the data storage configuration request comprising allocating storage for storing mailbox data of the email application.

2. The method of claim 1, further comprising:
processing said data storage configuration request for an application, said application comprising at least a portion of said email application;
determining a first user level of a plurality of user levels at which said data storage configuration request is made;
providing one or more rule sets defining mappings between different ones of said plurality of user levels, each of said different user levels being associated with a different level of abstraction with respect to processing performed in the data storage system for implementing the data storage configuration request;
selecting one of said one or more rules sets in accordance with said application, a data service requested in said data storage configuration request, and a user grouping including said plurality of user levels; and
servicing the data storage configuration request, said servicing including using a first rule of said selected rule set to map data of the data storage configuration request from said first user level to another user level and performing a first call from a first service provider associated with the first user level to a second service provider associated with a second of said plurality of user levels.

3. The method of claim 2, wherein the data storage configuration request is for provisioning storage for the application.

4. The method of claim 2, wherein the data storage configuration request is made from a host to an appliance hosting data storage for the application.

5. The method of claim 2, wherein the particular rule set selected by said selecting includes one or more quality of service parameters having values selected for a first usage of the application differing from other values for said one or more quality of service parameters selected from a different rule set for a second usage of the application.

6. The method of claim 2, wherein said first service provider and said second service provider are located on the appliance.

7. The method of claim 2, wherein the data storage request is made from a host to a network configuration of a plurality of data storage systems and said first service provider and said second service provider are located on a different ones of said plurality of data storage systems.

8. The method of claim 2, wherein one or more rules engines are used to perform processing in accordance with said selected rule set to service said data storage configuration request.

9. The method of claim 2, wherein said first rule maps a first user selected parameter to a second parameter and said second parameter is included in said first call.

10. The method of claim 2, wherein said first rule specifies one or more default parameter values and said one or more default parameter values are included in said first call.

11. The method of claim 2, wherein said servicing further includes using a second rule of said selected rule set to map data of the first call to the second service provider to data used for a second call from the second service provider to a third service provider associated with a third of said plurality of user levels.

12. The method of claim 11, wherein said user grouping includes said first, second and third user levels, said first user level provides a greatest level of abstraction of said first, second and third user levels and said third user level providing a least level of abstraction of said first, second and third user levels.

13. The method of claim 11, wherein said first rule provides for application specific mappings of user interface data to other terms included in said first call.

14. The method of claim 2, wherein the application is one of the email application, a database application, a medical office application, a law office application, or a banking application.

15. The method of claim 2, wherein said first rule includes at least one of a variable or a conditional statement evaluated at runtime when processing said data storage configuration request.

16. The method of claim 2, wherein a rule set selected by said selecting includes one or more rules, said one or more rules including at least one default specified in accordance with a requirement of said application, said at least one default being mapped by said one or more rules to at least one parameter that varies with a data storage system on which storage is used for the data storage configuration request.

* * * * *